(12) United States Patent
Carmichael

(10) Patent No.: US 7,827,359 B2
(45) Date of Patent: Nov. 2, 2010

(54) CLOCK ENCODED PRE-FETCH TO ACCESS MEMORY DATA IN CLUSTERING NETWORK ENVIRONMENT

(75) Inventor: Richard Carmichael, Austin, TX (US)

(73) Assignee: Spansion LLC, Sunnyvale, CA (US)

( * ) Notice: Subject to any disclaimer, the term of this patent is extended or adjusted under 35 U.S.C. 154(b) by 493 days.

(21) Appl. No.: 11/957,027

(22) Filed: Dec. 14, 2007

(65) Prior Publication Data
US 2009/0158005 A1  Jun. 18, 2009

(51) Int. Cl.
*G06F 13/00* (2006.01)
*G06F 9/26* (2006.01)
(52) U.S. Cl. .............. 711/137; 711/213; 711/E12.004
(58) Field of Classification Search .............. None
See application file for complete search history.

(56) References Cited

U.S. PATENT DOCUMENTS 6,047,359 A * 4/2000 Fouts .................. 711/137

* cited by examiner

*Primary Examiner*—Matt Kim
*Assistant Examiner*—Sean Rossiter
(74) *Attorney, Agent, or Firm*—Turocy & Watson, LLP

(57) ABSTRACT

Systems and/or methods that facilitate reading data from a memory component associated with a network are presented. A pre-fetch generation component generates a pre-fetch request based in part on a received read command. To facilitate a reduction in latency associated with transmitting the read command via an interconnect network component to which the memory component is connected, the pre-fetch request is transmitted directly to the memory component bypassing a portion of the interconnect network component. The memory component specified in the pre-fetch request receives the pre-fetch request and reads the data stored therein, and can store the read data in a buffer and/or transmit the read data to the requester via the interconnect network component, even though the read command has not yet reached the memory component. The read data is verified by comparison with the read command at a convergence point.

17 Claims, 18 Drawing Sheets

CLOCK ENCODED PRE-FETCH TO ACCESS MEMORY DATA IN CLUSTERING NETWORK ENVIRONMENT

TECHNICAL FIELD

The subject innovation relates generally to memory systems and in particular, to systems and methodologies that can facilitate expedient retrieval of data from memory devices.

BACKGROUND

To facilitate computer-based applications such as data-mining, video-on-demand, printing and publishing, digital imaging and video, rendering of graphics for computer-based animation, etc., high-bandwidth network systems have been developed to enable the transfer of large volumes of operating commands and data between processors coupled with memory storage devices. For systems using large interconnect networks whereby multiple processors can access multiple memory devices associated with the network, there can be latency associated with the interconnect network during execution of operations and retrieval of data. For example, during transfer of operating commands and data across the network, as each component (e.g., network tunnel component) of the network is encountered, the data packet can be parsed, routing and memory address information read, data forwarded, processed, etc., which can result in a time delay at each component, contributing to the overall latency associated with processing the operation via the network. The latency associated with the interconnect network can negatively impact read operations as the time utilized for retrieval of data can be in excess of the speed of the requesting processor, which can cause the processor to sit idle while awaiting delivery of the data, and, in worst case scenarios, can cause the processor to stall, which can further increase the latency of the system. This can have a negative impact on providing video and/or audio, rendering of graphics, etc.

One solution to reduce the read latency can be to build systems offering greater bandwidth and transmittal rates; however, such systems can be costly to purchase and operate, and complex to install and maintain. It is desirable to improve read performance associated with a network of processor(s) and devices, particularly with regard to high volume data retrieval from memory devices, by reducing latency that can be associated with executing a read operation and retrieving data from a memory device(s). It is further desirable to improve the read performance associated with such a network in a cost effective manner.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that can facilitate expedient retrieval and transfer of data from memory components (e.g., memory storage devices) to processors requesting the data, for example, as part of a data read operation. The disclosed subject matter can facilitate reducing and/or minimizing latency of the read process, thereby maximizing the efficiency of processing devices processing the retrieved data.

In accordance with one aspect of the disclosed subject matter, a pre-fetch generation component can generate pre-fetch requests that can facilitate efficient retrieval of data from memory components associated with a network. The pre-fetch generation component can be associated with an interconnect network component, that can be associated with a plurality of memory components and/or a plurality of other components (e.g., processor components, graphics controllers, etc.). The interconnect network component can be comprised of a plurality of interconnect tunnel components and/or an interconnect cave component (e.g., hub) that can facilitate routing data requests (e.g., read commands) to appropriate memory components and/or other components, and receiving and/or routing requested data to the requesting component (e.g., processor component).

When a read request is processed via submitting the read request through the interconnect tunnel components and/or interconnect cave component associated with the interconnect network component, there can be latency associated with each of the interconnect tunnel components and/or interconnect cave component, as such components can parse the command information to determine which memory component (or other component) to which the command information is to be routed. The amount of latency can be significantly increased in larger interconnect networks where there can be higher numbers of interconnect tunnel components, as there can be a latency associated with each interconnect tunnel component.

In accordance with an aspect, a read command can be generated and provided to the interconnect network component. The read command can contain information, such as, for example, memory component information, memory address information, bus information, etc., that can facilitate reading and/or retrieving data from a memory component. The read command can also include information related to error correction of the data and/or protocols to facilitate data reads. In one aspect, the pre-fetch generation component can receive the read command information and can facilitate generating a pre-fetch request that can include all, or a portion, of the information associated with the read command.

In another aspect, the pre-fetch generation component can facilitate transmission of the pre-fetch request to the memory component specified by the read command, via a propagation component(s), and can thereby bypass all or many of the interconnect tunnel components, the interconnect cave component, and an interconnect interface component, associated with the interconnect network component, and can thereby reduce the latency associated with processing of the read command by transmission of the read command via the interconnect network component. In still another aspect, the read command can also proceed to the desired memory component via the interconnect network component.

In one aspect, the pre-fetch request can be included as part of an encoded clock signal that can be transmitted (e.g., serially) to all components associated with the system. In accordance with an aspect, the propagation component(s) can be associated with the various components which comprise the interconnect network component (e.g., interconnect tunnel components, interconnect cave component, etc.) and also any associated memory component(s). The propagation component(s) can receive the encoded clock signal, which can include a pre-fetch request, from the pre-fetch generation component. The propagation component can parse the encoded clock signal to retrieve the pre-fetch request. If the pre-fetch request is directed to the memory component associated with such propagation component, the propagation component can facilitate providing the pre-fetch request to the memory component access of the memory component. In another aspect, the propagation component(s) can also be used to propagate the pre-fetch request throughout the interconnect network, forwarding the pre-fetch requests to another propagation component, or other component, for example. In accordance with another aspect, a clock recovery component can facilitate recovering the clock signal from the encoded clock signal.

In accordance with another aspect, the desired memory component can receive the pre-fetch request, via a propagation component(s), and can facilitate reading and/or retrieving the data associated with the pre-fetch request and can transfer such data to a buffer component in the memory component. In one aspect, the read data can be provided to the interconnect network component via the interconnect interface component and the read data can proceed to be transferred to the requesting component (e.g., processor component), even if the read command has not yet been received by the memory component. As the read data is transferred through the interconnect network component, the read data can converge with the read command within the interconnect network component, for example, at an interconnect tunnel component or an interconnect cave component, as the read data proceeds back to the requesting component and the read command proceeds towards the memory component. The component (e.g., interconnect tunnel component, interconnect cave component, etc.) at the convergence point can compare the read command information (e.g., memory component information, memory address information, etc.) with corresponding types of information associated with the read data and can determine whether the read data is the desired data associated with the read command. If the read data is associated with the read command, such component can facilitate transferring the read data to the requesting component and can also facilitate discarding the read command, as such read command can be obviated because the desired data has already been read from the memory device based in part on the pre-fetch request.

The amount of time to generate the pre-fetch request and transmit it to the desired memory component, via a propagation component(s), can be negligible, as compared to the respective latencies associated with the components of the interconnect network component. Further, by employing the pre-fetch request, the latency associated with transferring the read command through the interconnect network component can be reduced and/or eliminated.

In accordance with another aspect of the disclosed subject matter, when the pre-fetch request is received by the memory component, the data associated with the read request can be read from the memory location(s) specified in the pre-fetch request, and the read data can be transferred to the buffer component. The read data can reside in the buffer component until the read command is received by the memory component from the interconnect network component. When the read command is received by the memory component, the read command information can be compared to corresponding information associated with the read data to facilitate determining whether the read data is the data desired by the read command. As the data has already been read from the memory location(s) and placed in the buffer component, the latency associated with processing the memory request in the memory component, such as, for example, the time to access the memory location(s), read the data, and transfer the read data to the buffer component, can be reduced and/or eliminated, based in part on the pre-fetch request.

In accordance with one embodiment of the disclosed subject matter, the pre-fetch generation component can generate pre-fetch requests based in part on an 8-bit, 10-bit (8b10b) format to facilitate transmission of the pre-fetch request. In one aspect, the pre-fetch generation component can receive information associated with a read command, which can be a data packet in the form of 8-bit pieces of data, and can generate pre-fetch requests in an 8b10b format. The pre-fetch generation component can facilitate conversion of the 8-bit piece of data into a pre-fetch request that can be encoded as a 10-bit code base. By encoding the pre-fetch request in an 8b10b format, high transmission rates can be achieved to transmit the pre-fetch requests to the memory components, where the transmission of pre-fetch requests can be significantly faster than transmission of the read command based on an 8-bit based code via the interconnect network component.

In still another aspect, the pre-fetch generation component can facilitate encoding a pre-fetch request and incorporating it in a clock signal (e.g., based in part on an 8b10b format), where the encoded clock signal can be transmitted via a pin(s) associated with the clock signal to components, such as memory components, associated with the pre-fetch generation component. The discrete size of the pre-fetch request can allow the pre-fetch to be transmitted via the path associated with the clock signal, where the clock signal can be utilized to facilitate synchronization of connected devices or components.

In another aspect, a propagation component(s) can be utilized to receive the 10 bit-based clock encoded pre-fetch requests being transmitted throughout the network by the pre-fetch generation component and can convert the clock encoded pre-fetch requests back in to the original 8 bit-based code format. The propagation component(s) can also recover the clock from the clock encoded pre-fetch request along with extracting and parsing the read command information (e.g., memory component information, memory address information, etc.) contained therein. The propagation component can forward the 8 bit-based pre-fetch requests to any memory device(s) attached to the propagation component(s) to facilitate access of the memory device(s) and data stored in memory location(s) therein.

In yet another aspect, transmittal of the pre-fetch request information via the clock signal path can facilitate broadcast of the pre-fetch requests to memory controllers respectively associated with memory components, via the propagation component(s). By configuring the pre-fetch generation component to transmit the pre-fetch requests to memory components via the clock signal path, the pre-fetch requests can be transmitted and processed with minimal modification of existing hardware.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
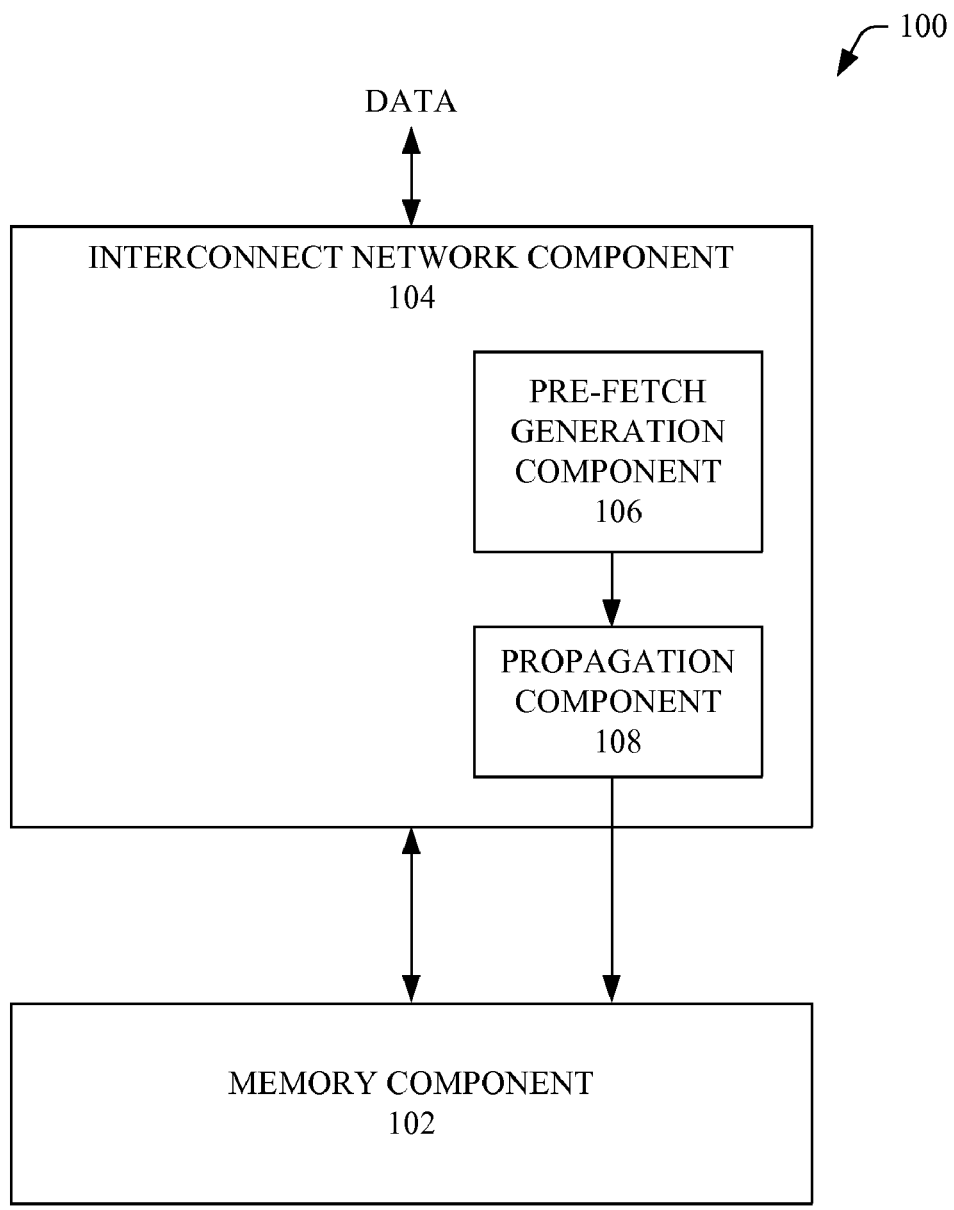
FIG. 1 illustrates a block diagram of a system that can facilitate access of data associated with a memory in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Central Processing Units (CPUs) and other processors are continually being developed with increased processing speeds. However, even with faster processors, system efficiency can still be limited by latency associated with network components. For example, while a processor can generate commands quickly and can process received data more quickly, during read operations to read data from memory devices associated with a network of devices and/or components, the latency associated with processing the read operation can be long enough that the processor can become idle or can stall while waiting for the requested data. Such network latency can negatively impact the transmission of data associated with video, audio, graphics, etc., and the performance of applications that can be run by the processor(s). While network latency may be reduced by incorporating faster network components, such components can be costly to procure and operate, and complex to install and maintain. It is desirable to increase read performance in a network environment in a cost effective manner.

Systems and/or methods are presented that can facilitate improved read performance associated with reading data from memory components (e.g., flash memory) associated with a network. A pre-fetch generation component can receive read command information and can facilitate generating pre-fetch requests based in part on the read command information and can transmit such pre-fetch requests directly to the memory component(s) to facilitate reading data from such memory component(s). The pre-fetch request can be received by the desired memory component, which can access the appropriate memory location(s), read or retrieve the desired data, and/or transmit the desired data to the requesting component (e.g., processor component) via the interconnect network component, even though the memory component has not received the read command yet, as the original read command can be proceeding through an interconnect network component, which can have a plurality of memory components and/or other components (e.g., graphics controller) associated therewith, while the pre-fetch of the data is performed. As a result, latency associated with transmitting the read command information through the interconnect network (and components therein) to the desired memory component, and/or latency associated with accessing the memory component and reading the data, and/or latency associated with transmitting read data from the memory component to the requesting component (e.g., processor component) can be reduced and/or eliminated, as compared to conventional systems, methods, and/or devices.

Turning to FIG. 1, illustrated is a system 100 that can facilitate access of data associated with a memory in accordance with an aspect of the disclosed subject matter. System 100 can include one or more memory components 102 (only one illustrated for clarity), where each memory component 102 can include a plurality of memory locations (e.g., memory cells) (not shown) in which data can be stored and/or accessed. In one aspect, each memory location can store one or more bits of data therein. In another aspect, a memory component 102 can be comprised of nonvolatile memory (e.g., flash memory, read only memory (ROM)) and/or volatile memory (e.g., random access memory (RAM)). For example, in one aspect, a memory component 102 can contain large amounts of data, such as data associated with video (e.g., movies, music videos, etc.), audio, and/or graphics. It is to be appreciated and understood that, while one memory component 102 is depicted in system 100, the subject innovation is not so limited, as system 100 can include a plurality of memory components 102. Only memory component 102 is depicted herein for brevity and clarity.

The memory component(s) 102 can be associated with an interconnect network component 104 that can facilitate transmission of commands (e.g., read, write, erase) and data between components (e.g., memory component(s) 102, processor component (not shown), graphics controller (not shown), etc.) that can be associated (e.g., via wired connection or wireless connection) with the interconnect network component 104. In one aspect, the interconnect network component 104 can be comprised of interconnect tunnel components (not shown), an interconnect cave component (not shown), and/or interfaces that can facilitate the transmission of commands and/or data to the desired components associated with the interconnect network component 104.

Conventionally, when a read command is generated to read data from a memory component 102 that is associated with an interconnect network component 104, the read command can be transmitted through the interconnect network component 104 to the memory component 102 specified in the read command. There can be a significant latency period associated with the transmission of the read command to the desired memory component 102, as the read command can be processed through various components (e.g., interconnect tunnel component(s), interconnect cave component, etc.), where there can be a respective latency period associated with each such component due to such components analyzing the read command information to determine the proper routing of the read command information so that the read command can be delivered to the memory component 102 specified by the read command. There can also be a latency associated with accessing data from the memory component 102, as the memory component 102 can process the read command to access the desired memory location(s) in the memory component 102 to read the data from such location(s), which can take a period of time that can be based in part on the type of memory component 102 (e.g., flash memory, ROM, etc.). Further, there can be latency associated with transmission of the read data to the requesting component via the interconnect network component 104. Moreover, the larger the interconnect network component 104 (e.g., the more components associated with and/or included in the interconnect connect component), the more latency that can be introduced through the transferring and/or routing of the read commands and/or data therein.

In accordance with an aspect of the disclosed subject matter, the system 100 can include a pre-fetch generation component 106 that can generate a pre-fetch request(s) based in part on a read command(s) to facilitate improving read performance associated with reading data from a memory component(s) 102 associated with the interconnect network component 104. In accordance with one embodiment, the pre-fetch generation component 106 can be contained in the interconnect network component 104. However, it is to be appreciated that in accordance with other embodiments of the disclosed subject matter, the pre-fetch generation component 106 can be a stand-alone component, and/or can be included in another component (e.g., processor component (not shown)), and/or any suitable combination thereof (including a combination comprising the interconnect network component 104 and the processor component).

System 100 can further include one or more propagation components 108. The propagation component(s) 108 can operate in conjunction with the pre-fetch generation component 106, whereby the propagation component(s) 108 can be used to receive the pre-fetch request(s) being broadcast by the pre-fetch generation component 106. A propagation component 108 can analyze the information contained in the received pre-fetch request(s) and facilitate access of memory component 102 to which the pre-fetch request(s) is directed based in part on the pre-fetch request(s). The propagation component 108 can also be used to facilitate the transmission of the pre-fetch request(s) throughout the network by forwarding the pre-fetch request to another propagation component 108 or other component, as more fully described herein.

In accordance with an aspect of the disclosed subject matter, the interconnect network component 104 can receive information (e.g., data) associated with a read command. The read command information can be supplied to the pre-fetch generation component 106. Based in part on the read command information, the pre-fetch generation component 106 can generate a pre-fetch request(s) that can be transmitted, via the propagation component(s) 108, to the memory component 102 that has the desired data stored in the memory location(s) specified in the pre-fetch request(s). In another aspect, the read command information can also proceed through conventional channels in the interconnect network component 104. The pre-fetch request can be received by the memory component(s) 102, and the memory component 102 specified in the pre-fetch request can process the read request.

In one aspect, the pre-fetch request can contain information, such as, for example, memory component information, memory address information, bus information, etc., that can facilitate reading and/or retrieving data from a memory component 102. In another aspect, the pre-fetch request can be encoded such that the pre-fetch request information can be included with a clock signal, so that the pre-fetch request can be transmitted with the clock signal via a clock signal pin(s) associated with the pre-fetch generation component 106 and transmitted to components, such as memory components 102, associated and/or connected to the pre-fetch generation component 106, such as propagation component(s) 108, and/or the interconnect network component 104. In accordance with one embodiment, the clock signal and pre-fetch request can be encoded based in part on an 8-bit, 10-bit (8b10b) format, as more fully described infra. The encoded clock signal can be transmitted at a very high rate of speed to other components (e.g., propagation component(s) 108, memory components 102) associated with the pre-fetch generation component 106, as compared to transmission rates associated with transmitting the read command via the interconnect network component 104 to a specified memory component 102. By configuring the pre-fetch generation component 106 to transmit the pre-fetch requests to memory components 102 via the clock signal path (e.g. via the propagation components 108), the pre-fetch requests can be transmitted and processed with minimal modification of existing hardware.

In another aspect, the propagation component(s) 108 and other components associated with the pre-fetch generation component 106 and/or interconnect network component 104 can receive the encoded clock signal. The propagation component(s) 108 can decode the encoded clock signal, with pre-fetch request information encoded therein, and the propagation component(s) 108 can obtain the pre-fetch request information from the encoded clock signal. The pre-fetch request can include information regarding a specified memory component 102 in which the data is stored, and the specified memory component 102 can utilize the pre-fetch request information to access the memory location(s) specified by the pre-fetch request and read the data therein. It is to be understood that the pre-fetch request can effectively be broadcast to all memory components 102, via propagation components 108, (and other components) associated therewith; if a pre-fetch request is not related to data stored in a particular memory component 102 attached to a particular propagation component 108, the particular propagation component 108 and/or the attached memory component 102 can disregard the pre-fetch request.

In accordance with an aspect, a read command can be generated and provided to the interconnect network component 104. The read command can contain information, such as, for example, information regarding the memory component 102 in which the desired data is stored, information regarding the memory address associated with the memory location(s) in memory component 102 where the desired data is stored, bus information, routing information, etc., that can facilitate reading and/or retrieving data from a memory component 102. The read command can also include information related to error correction of the data and/or protocols that can facilitate data reads.

In one aspect, the pre-fetch generation component 106 can receive the read command information and can facilitate generating a pre-fetch request that can include all, or a subset, of the information associated with the read command. In accordance with an aspect, the size of the pre-fetch request packet can be structured to be at a minimum, whereby the pre-fetch request can contain information to facilitate reading the data from the memory device, for example, in instances where the read data can reside in a buffer component in the memory device until the read command reaches the memory device. In another aspect, the pre-fetch request can contain additional information that can facilitate not only reading the data from the memory device, but can also facilitate transmission of the read data back to the requesting component via the interconnect network component. In yet another aspect, the pre-fetch generation component can discard any information/data contained in the read command that is not desired for inclusion in the pre-fetch request. Constraining the size of the pre-fetch request packet can facilitate a faster transmission of the pre-fetch request to the desired memory device to facilitate increased read performance.

In another aspect, the pre-fetch request can be encoded and incorporated with the clock signal, and the encoded clock signal can be transmitted (e.g., broadcast) from the pre-fetch generation component 106 via clock pin(s) associated with the pre-fetch generation component 106 to components, including propagation components 108 and/or memory components 102, associated with the pre-fetch generation component 106 and/or the interconnect network component 104. As a result, the pre-fetch generation component 106 can facilitate transmission of a pre-fetch request to the memory component 102 (via propagation component(s) 108) specified by the read command, as well as other components, and can thereby bypass certain components (e.g., interconnect tunnel components, interconnect cave component, etc.) associated with the interconnect network component 104, which can thereby reduce the latency associated with processing of the read command by transmission of the read command via the interconnect network component 104.

In still another aspect, the read command can also proceed to the memory component 102 specified in the read command via the interconnect network component 104 based in part on the read command information. The amount of time to generate the pre-fetch request and transmit it to the memory component(s) 102 can be negligible, as compared to the respective latencies associated with transmitting a read command via the interconnect network component 104. While the pre-fetch request is transmitted to the memory component 102 via the propagation component(s) 108, there can be minimal delay of the pre-fetch request(s) at each propagation component 108 as the propagation component 108 can retrieve and process any pre-fetch requests received by the propagation component 108 in parallel with the pre-fetch request proceeding on from the propagation component 108 to the next attached propagation component 108. The amount of time to convert a pre-fetch request into an encoded clock signal and propagate the encoded clock signal to a particular memory component 102 can be negligible, as compared to the amount of time that it takes for a read command to be transmitted to the memory component 102 via the components (e.g., interconnect tunnel components, interconnect cave component, etc.) associated with the interconnect network component 104.

In accordance with another aspect, a propagation component 108 can receive the encoded clock signal and can decode the encoded clock signal to recover the clock signal and retrieve the pre-fetch request. The propagation component 108 can forward the pre-fetch request to memory component 102 to facilitate reading and/or retrieving the data associated with the pre-fetch request from memory component 102, whereby memory component 102 can transfer such data to a buffer component (not shown) in the memory.

In one aspect, the read data can be provided to the interconnect network component 104 and the read data can proceed to be transferred to the component requesting the data, such as a processor component (not shown). As the read data is transferred through the interconnect network component 104, the read data can converge with the read command within the interconnect network component 104, for example, at an interconnect tunnel component, as the read data proceeds back to the requesting component and the read command proceeds towards the memory component 102. The component within the interconnect network component 104, at which the read data and read command converge, can compare the read command information (e.g., memory component information, memory address information, etc.) with corresponding types of information associated with the read data and can determine whether the read data is the data associated with the read command. If the read data is associated with the read command, such component can facilitate transferring the read data to the requesting component and can also facilitate merging the read command with the read data and/or discarding the read command, as such read command can be obviated because the desired data has already been read from the memory component 102 based in part on the pre-fetch request.

By employing the pre-fetch request, the latency associated with processing the read command by transmitting the read command through the interconnect network component 104 can be significantly reduced. For example, a portion of the latency associated with transmitting the read command to the memory component 102 can be eliminated because the read command can be discarded at the convergence point where the read command and the read data meet (or cross) each other in the interconnect network component 104. The period of time associated with transferring the read command from the convergence point to the memory component 102 can be eliminated as the data has already been read from the memory component 102. Also, as the data has already been read from the memory location(s) based in part on the pre-fetch request, the latency associated with processing the memory request in the memory component 102, such as, for example, the time to access the memory location(s), read the data, and transfer the read data to the buffer component, can be reduced and/or eliminated. Further, where the read data has been provided to the interconnect network component 104 and is being transferred to the requesting component based in part on the pre-fetch request, a portion of the latency associated with transmitting the read data through components (e.g., interconnect tunnel component, interconnect cave component, etc.) in the interconnect network component 104 can be eliminated with respect to such components that the read data has already passed through up to and/or through the convergence point.

In accordance with another aspect of the disclosed subject matter, when the pre-fetch request is received by the memory component 102, the data associated with the read request can be read from the memory location(s) specified in the pre-fetch request, and the read data can be transferred to the buffer component. The read data can reside in the buffer component until the read command is received by the memory component 102 from the interconnect network component 104. When the read command is received by the memory component 102, the read command information can be compared to corresponding types of information (e.g., memory address information) associated with the read data to facilitate determining whether the read data is the data desired by the read command. When the read data is associated with the read command, since such data has already been read from the memory location(s) and placed in the buffer component, the latency associated with processing the memory request in the memory component 102, such as, for example, the time to access the memory location(s), read the data, and transfer the read data to the buffer component, can be reduced and/or eliminated, based in part on the pre-fetch request.

Turning back to the encoding of pre-fetch requests as part of an encoded clock signal, in accordance with one embodiment of the disclosed subject matter, the pre-fetch generation component 106 can employ 8b10b technology to facilitate generation and/or transmission of pre-fetch requests. The pre-fetch request, generated by the pre-fetch generation component 106, can be created and formatted in 10 bit-based code using 8b10b (8 bits10 bits) technology. In coding 8 bit-based data as 10 bit-based data, the data in the pre-fetch request packet can undergo shape profiling, which can effectively re-shape the sequence of 0 and 1 bits in the data packet (e.g., pre-fetch request packet). The re-shaping of the data packet can allow the 10-bit pre-fetch request packet to be broadcast across the system 100 to memory components 102 associated therewith at much higher transmission rates than can be used for 8-bit data packets transmitted via the interconnect network component 104. The shaped 10-bit data bitstream, that can include the pre-fetch request information, can have a wave profile designed to achieve direct current (DC) balance (e.g., an equal number of ones and zeros in the bitstream) which can minimize charge buildup across the system 100 and can be incorporated into the clock signal used for clock synchronization (clock recovery) between connected components and/or devices, which can thereby make 8b10b format well suited for high-speed data transmission across networks and links connecting processors with peripheral components, such as memory components 102. For example, 10-bit data packets can be transmitted serially, via the propagation component(s) 108, at speeds ranging from 3 GHz to 6 GHz, while transmission speeds of 400 MHz to 800 MHz are common for an 8-bit data packet transmitted via a network (e.g., a network comprising an interconnect network component 104).

The bit transitions within the 10-bit data packet and the packet constraints, along with the ability to recover the clock, can minimize the complexity of the coding/decoding components, which can further improve the efficiency of the read process. During the initial 8b10b coding, other modifications can be made to the code during the transition from the 8-bit to 10-bit code, including, for example, the removal of opcode, instructions, commands, and/or other data that can be redundant to the 10-bit format, which can thereby further improve efficiency.

In accordance with an aspect, an encoded clock signal, encoded in an 8b10b format, can be transmitted from the pre-fetch generation component 106 by employing relatively low cost serial link transmission systems and/or devices (e.g., incorporated into the propagation component(s) 108), such as, for example, Serial Advanced Technology Attachment (SATA), Serial Attached Small Computer System Interface (Serial Attached SCSI or SAS), Fibre Channel, Peripheral Component Interconnect (PCI) Express (PCIe), 10-Gig Ethernet, etc. For example, the pre-fetch requests can be transmitted from the pre-fetch generation component 106 via the use of a SATA bus, with the 10-bit-based pre-fetch request data incorporated into the clock signal, which can allow the pre-fetch requests to be broadcast across all components (e.g., propagation components 108) associated (e.g., by serial link) with the pre-fetch generation component 106. Upon arrival at each propagation component(s) 108, each propagation component 108 can parse the pre-fetch request to determine if the pre-fetch request applies to the memory component(s) 102 associated with the propagation component 108. If the pre-fetch request is for data stored in memory location(s) in the memory component 102 associated with the propagation component 108, the pre-fetch request can be forwarded by the propagation component 108 to the associated memory component 102. The memory component 102 can receive the pre-fetch request, and can service the pre-fetch request, as the memory component 102 can initiate the retrieval of the data at the memory location(s) indicated in the pre-fetch request. If the pre-fetch request is not related to data stored in a particular memory component 102 associated with the propagation component 108, the propagation component 108 can propagate such pre-fetch request to another propagation component 108, while not forwarding the pre-fetch request to the memory component 102 associated therewith, since the pre-fetch request is not directed to such memory component 102.

In accordance with another aspect, the size of the pre-fetch request data packets can be kept to a minimum to facilitate efficient transmission by the serial data bus. For example, a pre-fetch request data packet can be of a magnitude in the order of 64 bytes. In contrast, the size of the data packet being retrieved from a memory component 102 can be many magnitudes larger (e.g., 16 kbytes); and it can be more efficient to return these larger data packets (e.g., read data) via the interconnect network component 104 to the component requesting the data from the memory component 102.

In still another aspect, to facilitate the small size of the pre-fetch data packet, error check information related to the memory address of the read request does not have to be included in the pre-fetch data packet. Error check information is unnecessary, as the reading of data based in part on the pre-fetch request is a non-destructive process. In such instance, during servicing of the read request based on the pre-fetch request, the propagation component 108 and/or memory component 102 do not perform an error check regarding the memory address, and can service the read request based in part on the memory address information of the pre-fetch request. Statistically, there can be relatively few errors in memory address information and/or memory component identification information; however, on relatively rare occasions, there can be an error, such as a "bitflip" (e.g., a single event upset (SEU)), for example, in the memory address information or memory identification information associated with a pre-fetch request. A bitflip can be a random event whereby the bit value of a memory address (or bit value of memory component identification information) contained in a data request can be flipped to its opposite state (e.g., a one to a zero, or conversely, a zero to a one).

If a bitflip of the memory address data contained in the pre-fetch packet occurs during transmission/processing of the pre-fetch request, the bitflip error can result in the pre-fetch request accessing the wrong memory register or incorrect memory component. This is not problematic, as, instead, the data can be read from the memory component 102 based in part on the read command when the read command reaches the memory component 102. Data read from a memory component 102 as a result of an error in the pre-fetch request can be discarded when it is determined that such data is not associated with the read command.

Turning back the memory component(s) 102, the memory component(s) 102 can be comprised of nonvolatile memory and/or volatile memory. The nonvolatile memory can include, for example, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM, and/or nonvolatile RAM (e.g., ferroelectric RAM (FeRAM)). The volatile memory can include, for example, RAM, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and/or Rambus dynamic RAM (RDRAM).

Also, the memory component(s) 102, can be of a disk storage type, including, but not limited to, a magnetic disk drive, floppy disk drive, tape drive, Jaz drive, Zip drive, LS-100 drive, flash memory card, or memory stick. In addition, disk storage can include storage media separately or in combination with other storage media including, but not limited to, an optical disk drive, such as a compact disk ROM device (CD-ROM), CD recordable drive (CD-R Drive), CD rewritable drive (CD-RW Drive), or a digital versatile disk ROM drive (DVD-ROM).

Figure 2:
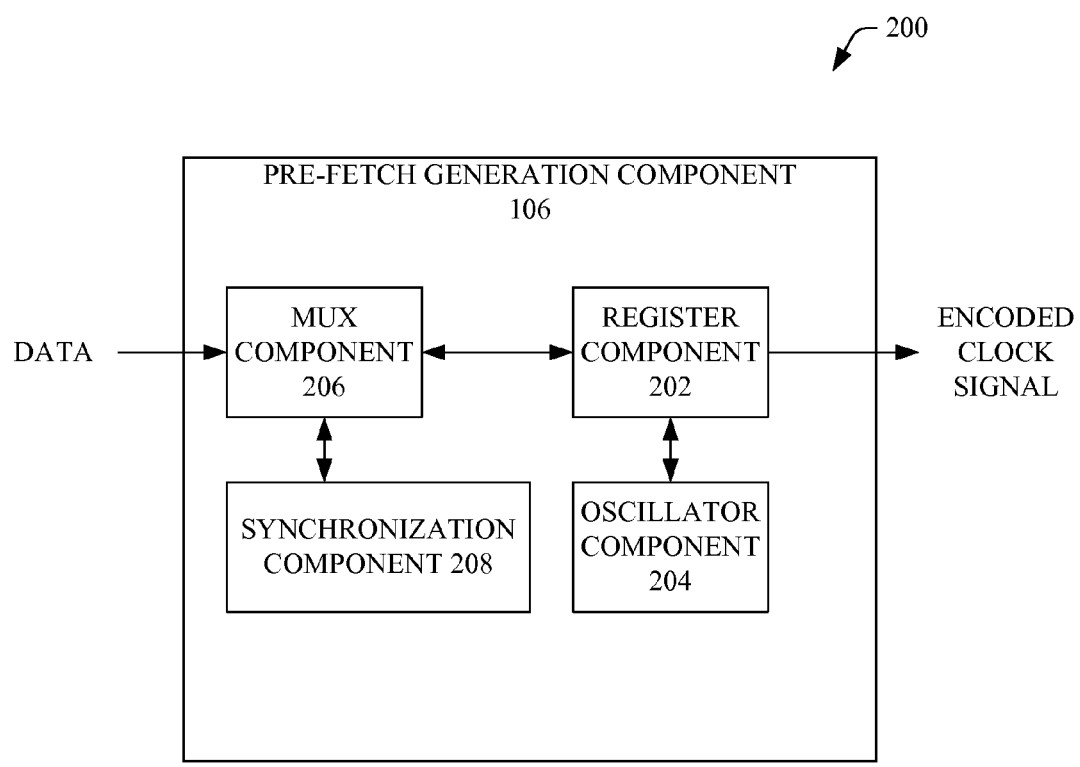
FIG. 2 depicts a block diagram of a system that can generate a pre-fetch request in accordance with the disclosed subject matter.

Referring to FIG. 2, depicted is a block diagram of a system 200 that can generate a pre-fetch request(s) in accordance with an aspect of the disclosed subject matter. System 200 can comprise a pre-fetch generation component 106 that can be used to generate a pre-fetch request(s) which can be used to facilitate access (e.g., reading data from) the memory component(s) 102 (e.g., as illustrated in FIG. 1 and described herein).

The pre-fetch generation component 106 can be comprised of a register component 202, which can be utilized to create an encoded clock signal which can be comprised of a clock, a pre-fetch request and/or synchronization code. In one aspect, the pre-fetch generation component 106 can be comprised of a register component 202 which can be used to create a pre-fetch request(s) in conjunction with a clock signal provided by the oscillator component 204. The pre-fetch generation component 106 can create an encoded clock signal using read request data forwarded to the register component 202 by the multiplexor (MUX) component 206 and/or clock synchronization data generated by the synchronization component 208.

In another aspect, the encoded clock signal generated by the register component 202 can be a combination of the data read request received at the MUX component 206 from an external processor(s) (not shown) generating the read request for data, and a clock signal generated by the oscillator component 204. The read request received at the MUX component 206 from the external processor(s) can contain information, such as, information regarding the address of the memory component 102 (e.g., as illustrated in FIG. 1 and described herein) in which the desired data is stored, information regarding the memory address associated with the memory location(s) in memory component 102 where the desired data is stored, bus information, routing information, etc. that can facilitate reading and/or retrieving data from memory component 102. The read request can also include information related to error correction of the data and/or protocols that can facilitate data reads. In still another aspect, the read request received at the MUX component 206 can be 8 bit-based data received in parallel communication.

In yet another aspect, the MUX component 206 can be analogous to an intelligent switch, whereby the MUX component 206 can continuously monitor the data input line from the requesting processor(s) (not shown), to detect if any data read requests have been received from the external processor(s). In one aspect, if and/or when the MUX component 206 detects that read request data is being received on the data input line, the MUX component 206 can switch its internal circuitry (not shown) to facilitate transmission of the received read request into the register component 202. In another aspect, if and/or when the memory MUX component 206 does not detect any read request data being received on the data input line, the internal circuitry of the MUX component 206 can be switched to facilitate transmission of synchronization code from the synchronization component 208 to be advanced to the register component 204. Synchronization code can be binary code of a systematic pattern (e.g., synchronization code-group D25.1) that can facilitate clock recovery from the encoded clock signal when the encoded clock signal reaches a destination. In yet another aspect, the MUX component 206 can output a continuous signal of read request data, synchronization code, or a combination thereof, to the shift register component 202. The parallel, 8 bit-based output signal from the MUX component 206 can be at a frequency of, for example, 300 MHz.

In one embodiment, the signal output by the MUX component 206 is received by the shift register component 202. The shift register component 202 can facilitate the generation and transmission of the 10 bit-based encoded clock signal, comprising the pre-fetch request, from the 8 bit-based code received at the shift register component 202 from the MUX component 206. Using 8b10b technology the shift register component 202 can convert the 8 bit-based code in to 10 bit-based code and, in combination with the clock signal generated by the oscillator component 204, can broadcast the 10 bit-based encoded clock signal to all the components (e.g., memory component 102, as illustrated in FIG. 1 and described herein) associated with the pre-fetch generation component 106. During the conversion from 8 bit-based code to 10 bit-based code the shift register component 202 can also shift the code from being parallel-based to being serial-based, which in conjunction with the benefits of transmission rendered by using 10 bit-based code, facilitates serial transmission of the pre-fetch request at much higher rates than can be achieved by parallel communication, for example, serial transmission rates of 3 GHz or higher versus parallel transmission rates of 300 MHz.

In another aspect, the register component 202 can take the 10 bit-based packets of pre-fetch request information and insert (inject) the packets in to the clock signal. For example, the oscillator component 204 can generate a clock at a predetermined rate of 300 MHz while the 10 bit-based pre-fetch request code can be generated at 3 GHz. The ratio of the frequency between the 300 MHz clock to the 3 GHz generation of pre-fetch request code allows for 10 bits of code to be injected in to the clock for each clock pulse. The regulator component 202 can similarly facilitate the conversion of 8-bit based synchronization code received from the MUX at a predetermined rate of 300 MHz, when no read requests are being processed at the MUX, and can convert the received synchronization code in to 10 bit-based code at a frequency of 3 GHz and inject this modified synchronization code in to the clock signal. Similar ratios of clocking versus code generation frequency (e.g., a 400 MHz clock vs. 4 GHz 10 bit-based code, 600 MHz clock vs. 6 GHz 10 bit-based code, or ratio variations thereof) can be used to facilitate the injection of 10-bit based pre-fetch request(s) in to the encoded clock signal.

Figure 3:
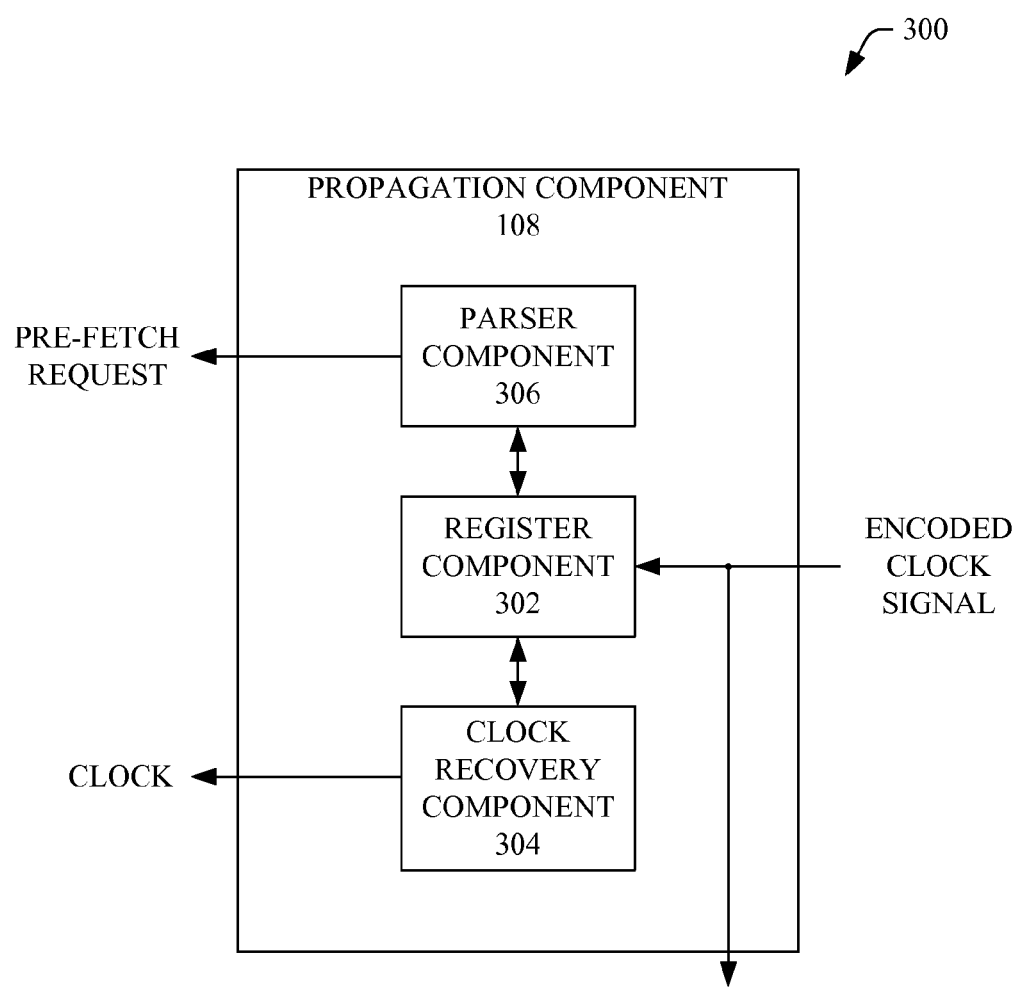
FIG. 3 illustrates a system that can facilitate propagation of a pre-fetch request in accordance with an aspect of the disclosed subject matter.

Turning to FIG. 3, illustrated is a system 300 that can facilitate the retrieval of a pre-fetch request from an encoded clock signal in accordance with an aspect of the disclosed subject matter. In one aspect, the system 300 can be or can include a propagation component 108 which can be utilized to facilitate receiving an encoded clock signal and extracting read request information in the form of a pre-fetch request that can be encoded within the encoded clock signal. The propagation component 108 can be comprised of a shift register component 302 that can facilitate converting the pre-fetch request from serial, 10-bit based code in to parallel, 8-bit based code. The propagation component 108 can employ a clock recovery component 304 that can be used to recover the clock from the encoded clock signal coming in to the propagation component 108, and a parser component 306 that can be used to parse the encoded clock signal to retrieve the pre-fetch request (e.g., memory device address information, memory location address information, etc.).

In one aspect, the encoded clock signal can be generated by the pre-fetch generation component 106 (e.g., as depicted in FIGS. 1 and 2, and described herein) and serially broadcast by the pre-fetch generation component to all component(s) (e.g., memory component 102, as depicted in FIG. 1 and described herein) associated with the pre-fetch generation component. In one aspect, the encoded clock signal received by the register component 302 can be 10-bit based code formatted for serial transmission. The shift register component 302 can be used to facilitate the conversion of the serial, 10-bit based pre-fetch request in to parallel, 8 bit-based code. In another aspect the register component 302, in conjunction with the clock recovery component 304, can process the encoded clock signal and recover the clock to allow any component(s) attached to the propagation component 108 to be synchronized with the propagation component 108 and/or other components associated therewith.

In another aspect, the parser component 306 can be associated with the register component 302 and can parse the pre-fetch request from the encoded clock signal to extract the command information and/or data contained within the encoded clock signal. In still another aspect, the parser component 306 can analyze the pre-fetch request information to determine whether the pre-fetch request is to be routed to a memory component (not shown) associated with the propagation component 108, e.g., the pre-fetch request is parsed to determine if the pre-fetch request contains the address of the memory component associated with the propagation component 108. If the pre-fetch request is for the associated memory component, the parser component 306 can forward the pre-fetch request, and the information contained therein, to the associated memory component to facilitate accessing (e.g., reading data from) the memory component and servicing the read request based in part on the information contained within the pre-fetch request. If the parser component 306 and/or the associated memory component determine that the read request information contained within the pre-fetch request is not addressed to the associated memory component then the pre-fetch request can be discarded.

Figure 5:
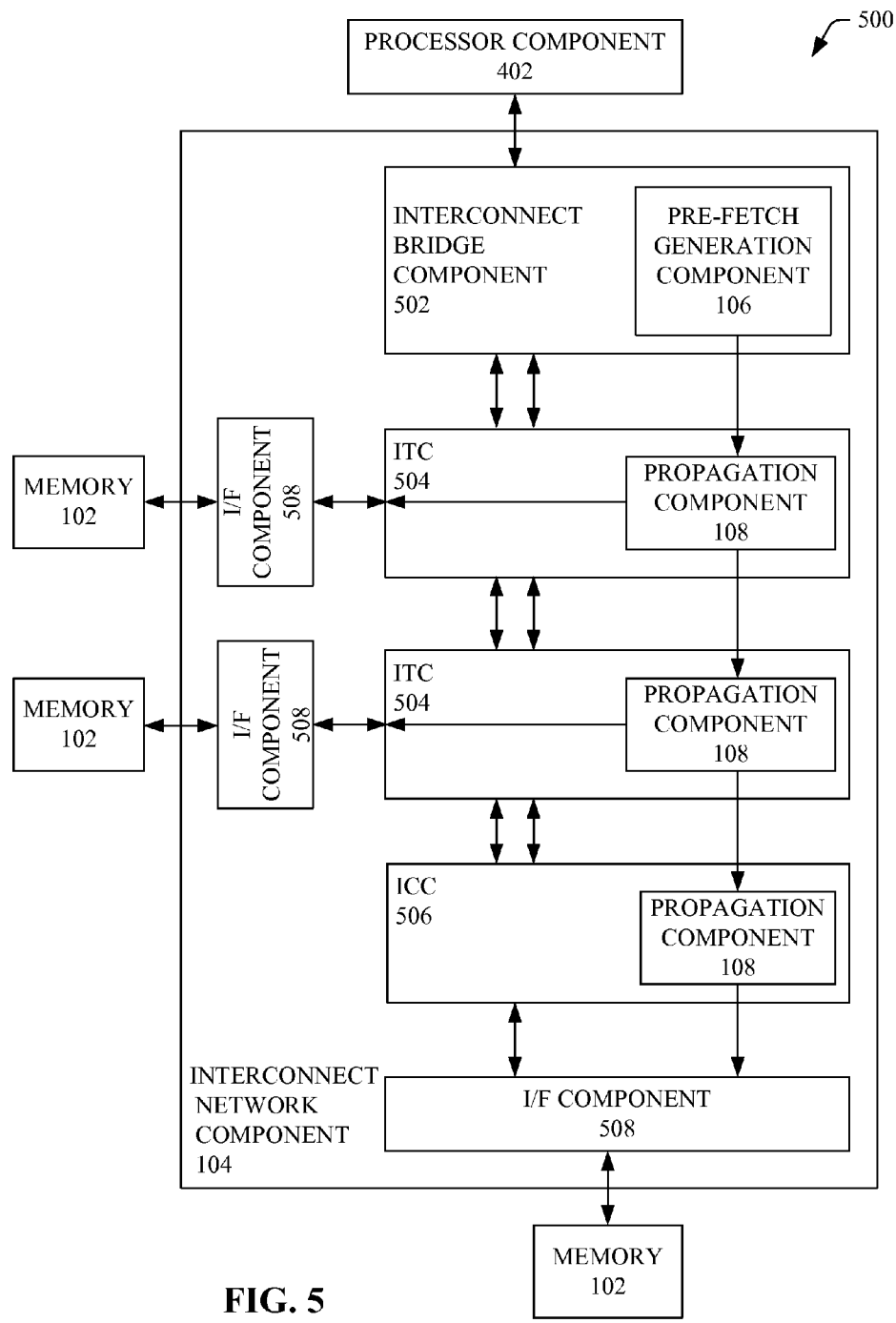
FIG. 5 illustrates a block diagram of a system that can facilitate access of data associated with a memory in accordance with an aspect of the subject matter disclosed herein.

In another aspect, the propagation component 108 can be used to facilitate the transmission of the pre-fetch request(s), embedded in the encoded clock signal, throughout the network (not shown). A series of serially connected propagation components 108 can be connected to devices and components that form the interconnect network component 104 (e.g., as illustrated in FIGS. 1 and 5, and described herein). The propagation components 108 can be used to associate (e.g., connect) the pre-fetch generation component 106 (e.g., depicted in FIGS. 1 and 2, and described herein) with the memory components associated with the interconnect network component. The propagation components 108 can forward the pre-fetch requests embedded in the encoded clock signal, as generated by the pre-fetch generation component, throughout the network, from one propagation component 108 on to the next propagation component 108 in a daisy-chain fashion (e.g., as discussed herein). In one aspect, utilizing the propagation components 108 to facilitate the transmission of the pre-fetch request can result in minimal delay in the transmission of the pre-fetch request across the interconnect network as each propagation component 108 can forward a pre-fetch request to the next propagation component 108 at the same time or substantially the same time that the propagation component 108, and the components of which is it comprised (e.g., 302, 304, 306), receive and parse the pre-fetch request contained within the encoded clock signal.

Figure 4:
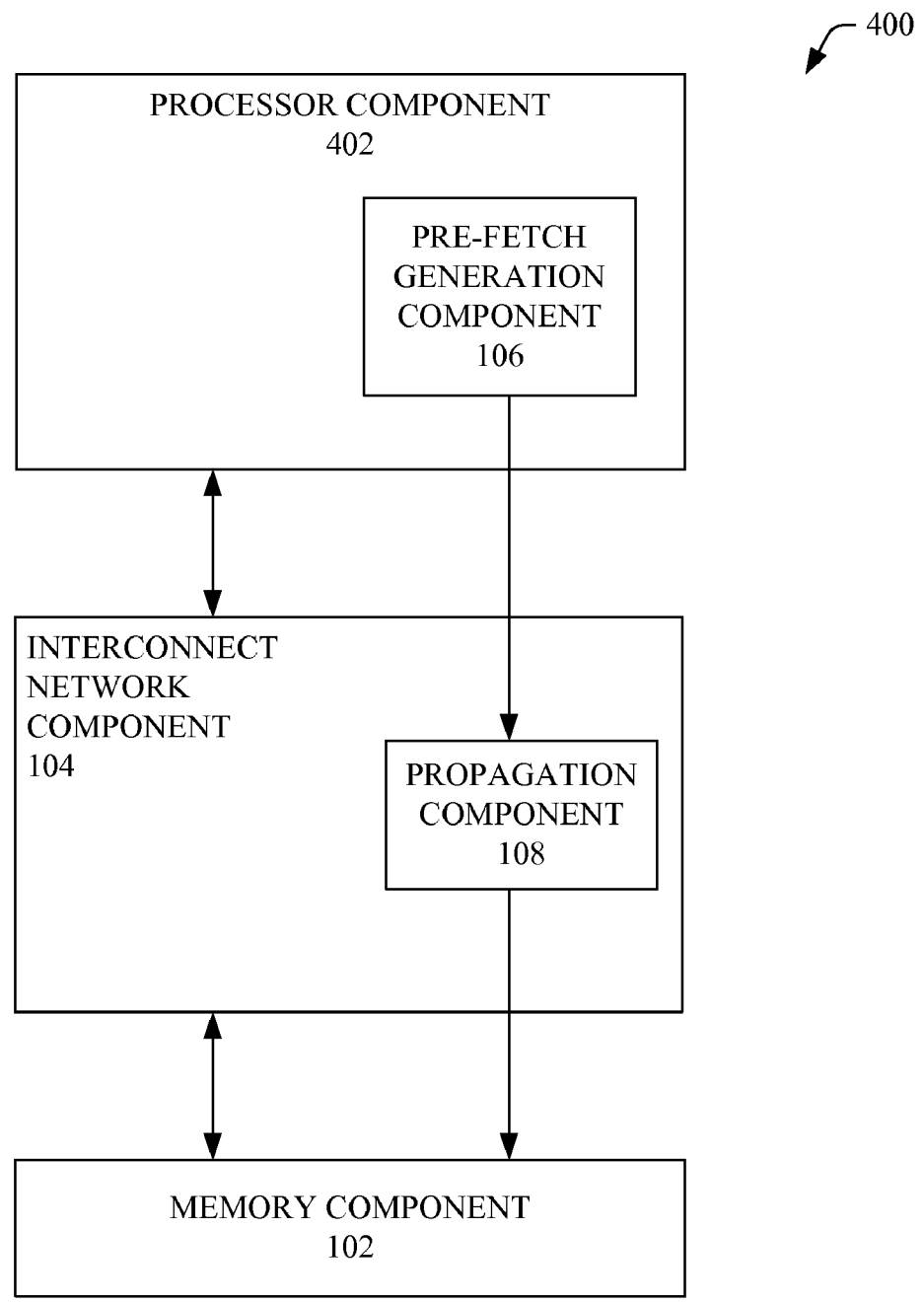
FIG. 4 depicts a block diagram of another system that can facilitate access of data associated with a memory device in accordance with an aspect of the disclosed subject matter.

Referring to FIG. 4, depicted is a block diagram of a system 400 that can facilitate access of data in a memory in accordance with an aspect of the disclosed subject matter. System 400 can include a memory component(s) 102 that can store data in memory locations contained in the memory component(s) 102. System 400 can also include an interconnect component 104 that can facilitate the transmission of data between components (e.g., memory component(s) 102) and other components associated with the interconnect network component 104. It is to be appreciated that the memory component(s) 102 and interconnect network component 104 can each respectively be the same or similar to respective components, and/or can include respective functionality, as more fully described herein, for example, with respect to system 100. Further, it is to be appreciated and understood that, while one memory component 102 is depicted in system 400, the subject innovation is not so limited, as system 400 can include a plurality of memory components 102. Only memory component 102 is depicted herein for brevity and clarity.

System 400 can include a processor component 402 that can be a typical applications processor that can manage communications and run applications. The processor component can generate commands, such as read, write, and/or erase commands, which can be provided to other components (e.g., interconnect network component 104, memory component 102), and can receive data from other components. It is to be appreciated that, while one processor component 402 is depicted and described, the subject innovation is not so limited, and the subject innovation contemplates that there can be more than one processor component 402 that can be employed in system 400 and associated with the interconnect network component 104.

In accordance with one embodiment of the disclosed subject matter, the processor component 402 can include a pre-fetch generation component 106 that can facilitate generating pre-fetch requests to read data from memory component(s) 102 associated with the interconnect network component 104 to facilitate improving read performance associated with reading data from the memory component(s) 102. Further, the interconnect network component 104 can also have an associated propagation component(s) 108, with the propagation component(s) 108 being used to facilitate the extraction of the pre-fetch request(s) from the encoded clock signal and transmitting the pre-fetch request to the memory component 102 associated with the propagation component 108. The pre-fetch generation component 106 and the propagation component 108, can include the same or similar functionality, as more fully described herein, for example, with respect to system 100, system 200 and system 300.

By employing the pre-fetch generation component 106 within the processor component 402, as opposed to incorporating the pre-fetch generation component 106 within the interconnect network component 104, latency associated with read commands provided to the interconnect network component 104 can be reduced and/or minimized, as the pre-fetch generation component 106 can receive the read command information directly through the processor component 402, as opposed to waiting for the read command to be provided to the interconnect network component 104, where there can be latency that can be introduced as a result of the read command being transmitted through an interface (not shown) and/or an interconnect bridge (not shown) within the interconnect network component 104.

As a result, system 400 can provide improved read performance with regard to read operations associated with memory component(s) 102 connected (e.g., wired connection, wireless connection) to the interconnect network component 104, as a significant portion of the latency associated with processing read commands can be eliminated and/or reduced as a result of pre-fetch requests that can facilitate reading data from the memory component(s) 102 in an efficient manner.

Turning to FIG. 5, illustrated is a system 500 that can facilitate access of data associated with memory components in accordance with an aspect of the disclosed subject matter. System 500 can include a plurality of memory components 102 (only two memory components 102 are illustrated for clarity) that can each include a plurality of memory locations wherein data can be stored and accessed. System 500 can also include an interconnect network component 104 that can facilitate transmission of data between the memory components and other components (e.g., processor component 402). The interconnect network component 104 can be associated with a processor component 402 that can be a typical processor that can generate commands, run applications, and process data. The memory components 102, interconnect network component 104, and processor component 402 can each be the same or similar as, and/or can include the respective functionality as, respective components as more fully described herein, for example, with regard to system 100, system 200, system 300, and/or system 400.

System 500 can contain an interconnect bridge component 502 that can facilitate propagating command information to components (e.g., memory component 102) specified by a command and/or transmitting data to a component (e.g., processor component 402) that requested such data. The interconnect bridge component 502 can receive command information (e.g., memory component information, memory address information, etc.) and/or data from the processor component 402 and can evaluate such command information and/or data to facilitate determining where the command information and/or data can be routed so that the command information and/or data can be provided to the particular component (e.g., memory component 102) associated with the interconnect network component 104 and the operation associated with the command can be performed. In another aspect, the interconnect bridge component 502 can receive data read from a memory component 102, and, based in part on information (e.g., information identifying the component requesting the read data) associated with the read data, can facilitate providing the read data to the proper component (e.g., processor component 402).

In accordance with one aspect, the interconnect bridge component 502 can receive information, such as 8-bit pieces of data, that can include memory component information, memory address information, bus information, destination information, etc., to facilitate accessing the desired data from the desired memory component 102 providing such data to the desired component (e.g., processor component 402).

The interconnect bridge component 502 can be associated with a predetermined number of interconnect tunnel components 504 that can facilitate routing of command information and/or data to components (e.g., graphics controller (not shown)) connected to the interconnect network component 104 and/or components (e.g., other interconnect tunnel components 504, interconnect cave component 506 (e.g., as described herein) associated therewith. Each interconnect tunnel component 504 can evaluate information associated with an operation (e.g., read, write, erase) to facilitate determining where information can be routed so that such information can be provided to the particular component associated with the operation. For example, if a command is not addressed to a component connected to that interconnect tunnel component 504 (e.g., via interface component 508, described herein), the interconnect tunnel component 504 can forward the command to the next interconnect tunnel component 504 or another component (e.g., interconnect cave component 506). The number of interconnect tunnel components 504 can be virtually any number desired.

In accordance with an aspect, the interconnect network component 104 can contain one or more interconnect cave components 506 (e.g., hub) that can be respectively associated with a subset of the interconnect tunnel components 504 and can facilitate transmission of data and/or commands communicated between memory components 102 and the processor component 402 and/or other components (not shown). Each interconnect cave component 506 can evaluate information associated with an operation (e.g., read, write, erase) to facilitate determining where information can be routed so that such information can be provided to the particular component associated with the operation. In accordance with one aspect, there can be an interconnect cave component 506 associated with each memory component 102 that can be connected to the interconnect network component 104.

In another aspect, the interconnect network component 104 can include a plurality of interface components 508 (also referred to herein as "I/F 508") that can facilitate transmission of information (e.g., commands, data, etc.) to and/or from the interconnect network component 104 and other components (e.g., processor component 402, memory components 102, graphics controller (not shown), etc.) associated therewith.

As more fully described herein, for example, with regard to systems 100, 200, 300, 400, 600 and/or 700, there can be latencies associated with transmitting command information and/or data via the interconnect network component 104. For example, each transmission of a command (e.g., read) or data packet between components (e.g., 502, 504, 506, 508)

included within the interconnect network component 104 can be termed a "hop". For each hop, there can be a latency period as, for each hop, the component receiving information in the interconnect network component 104 can parse the command information and/or data to determine whether the routing of such command or data, including whether the command or data is to be routed to a component associated therewith via an interface component 508 and/or whether the command or data is to be provided to an interconnect tunnel component 504 or other component contained within the interconnect network component 104.

In accordance with an aspect of the disclosed subject matter, the pre-fetch generation component 106, in conjunction with the propagation component(s) 108, can facilitate reducing the latency with respect to read commands associated with reading data from memory components 102 by generating pre-fetch requests, based in part on the read command information, that can be provided, via the propagation component(s) 108, directly to the memory component(s) 102 in which the data associated with the read command is stored to facilitate reading the data, buffering the data, and/or providing the data before the read command itself is provided to the particular memory component 102 via the interconnect network component 104.

In system 500, each of the components which comprise the interconnect network component 104, e.g., the interconnect tunnel component(s) 504 and interconnect cave component(s) 506 can have an incorporated propagation component 108, to facilitate the transmission of the pre-fetch request in the encoded clock signal generated by the pre-fetch generation component 106 to the memory component(s) 102. As the pre-fetch request, embedded within the encoded clock signal, propagates through the daisy-chain of connected propagation components 108, the propagation components 108 simultaneously forward the encoded clock signal on to the next propagation component 108 in the chain as well as, in parallel, receiving the encoded clock signal, extracting the pre-fetch request from the encoded clock signal, extracting the memory address information contained within the pre-fetch request, parsing the memory address information and, if required (e.g., the memory address information contained within the pre-fetch request is for the memory component 102 attached to the propagation component 108), forwarding the pre-fetch request to the memory component 102 attached to the propagation component 108 to facilitate access of the attached memory component 108 and retrieval of data from the memory location(s) therein.

Note that while system 500 depicts a pre-fetch generation component 106 being associated with the interconnect bridge component, in another embodiment the pre-fetch generation component 106 can reside at the processor component 402 (refer to system 400) which would require a propagation component 108 to be incorporated in to the interconnect bridge component 502 to facilitate transmission of the pre-fetch request from the pre-fetch generation component 106 to the memory component 102.

In one aspect, a pre-fetch request can be received and processed by a memory component 102, and the read data can be provided to the interconnect network component 104 to be provided to the requesting component (e.g., processor component 402). The read data can converge with the read command at a component (e.g., interconnect tunnel component 504) as the read data proceeds towards the requesting component and the read command proceeds towards the memory component 102. At the convergence point, the read data can be compared with the read command to determine if the read data is associated with the read command, for example, by comparing memory address and/or memory device information. Upon determining that the read data is associated with the read command, the read data can proceed through the interconnect network component 104 to the requesting component, and the read command can be discarded and/or merged with the read data, as the read request has already been fulfilled. As a result, all or a portion of the latency associated with transferring the read command through the interconnect network component 104 and/or transmitting the data from the memory component 102 through the interconnect network component 104 to the desired component (e.g., processor component 402), as well as the latency associated with accessing the data in the memory component 102, can be eliminated and/or reduced.

In accordance with another aspect, a pre-fetch request can be received and processed by a memory component 102 and the read data can be temporarily stored in a buffer component (not shown) in or associated with the memory component 102, where the data can be provided to the interconnect network component 104 when the read command associated with the read data is received by the memory component 102. As a result, all or a portion of the latency associated with transferring the read command through the interconnect network component 104 to the memory component 102 as well as the latency associated with accessing the data in the memory component 102, can be eliminated and/or reduced.

It is to be appreciated and understood that, for purposes of brevity and clarity, system 500 is depicted with three memory components 102, one interconnect cave component 506, and two interconnect tunnel components 504, and associated interface components 508, but the subject innovation is not so limited, as the subject innovation contemplates that there can be more or less than the depicted number of respective components in accordance with the disclosed subject matter.

Figure 6:
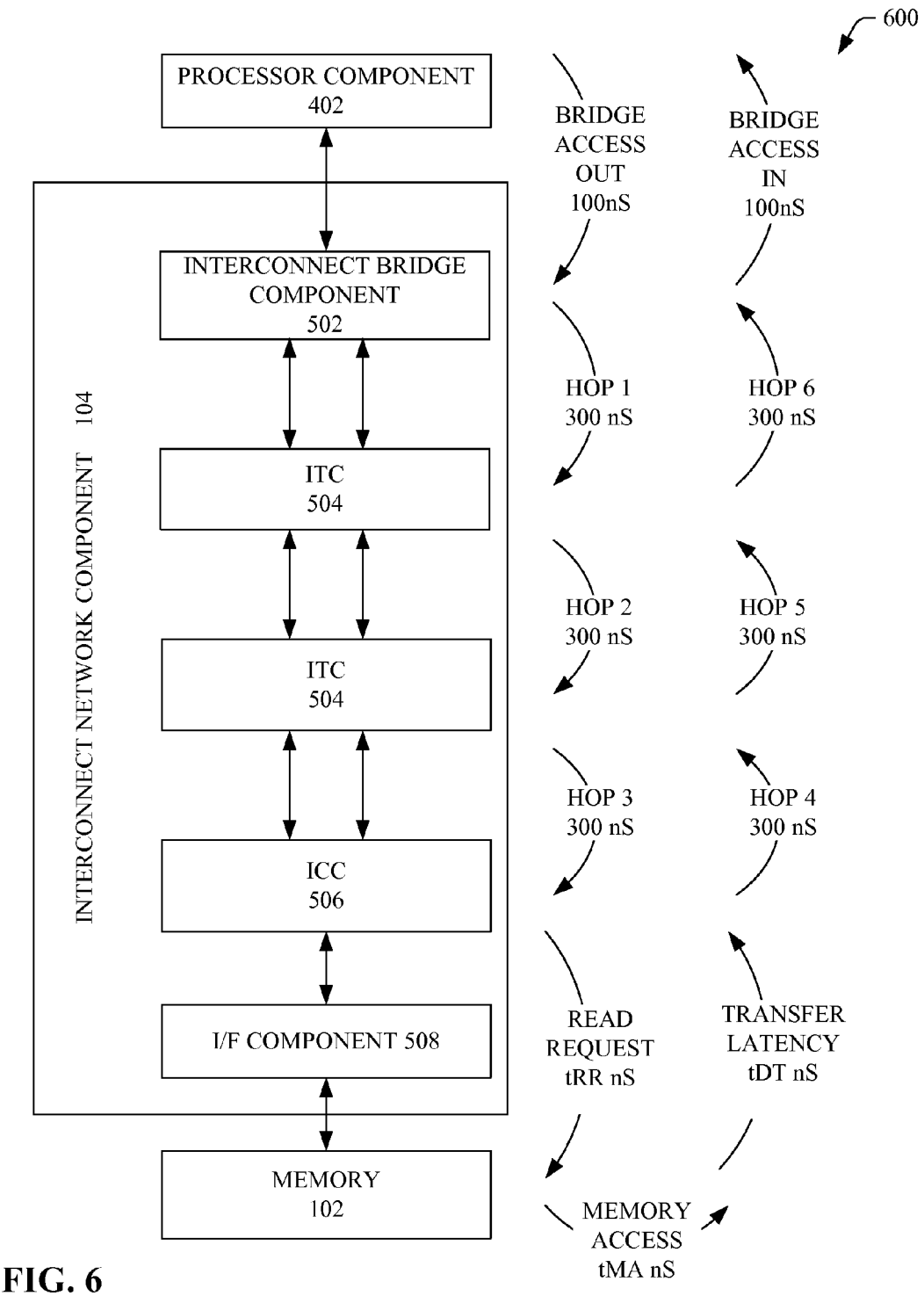
FIG. 6 illustrates a block diagram of a system that can employ an interconnect network component to access data associated with a memory.

Referring to FIG. 6, depicted is an exemplary system 600 that can access data from a memory. System 600 can include a memory component 102, a processor component 402, an interconnect network component 104, an interconnect bridge component 502, interconnect tunnel components 504, an interconnect cave component 506, and an interface component 508, wherein each of these components can be the same or similar as, and/or can include the same or similar respective functionality, as respective components more fully described herein, for example, with regard to system 100, system 400, and/or system 500.

As illustrated in system 600, there can be respective latency periods associated with hops to/from components in or associated with the interconnect network component 104 and/or accessing data stored in the memory component 102. For example, there can be approximately 100 ns of latency associated with data being transmitted to the interconnect bridge component 502 from another component, such as a processor component 402, associated with the interconnect network component 104 (e.g., depicted as "bridge access out" in FIG. 6). As another example, there can be approximately 300 ns of latency associated with transmitting and/or processing data between the interconnect bridge component 502 and an interconnect tunnel component 504 adjacent thereto (e.g., depicted as "hop 1", "hop 6", in FIG. 6), and/or between adjacent interconnect tunnel components 504 (e.g., depicted as "hop 2", "hop 5", in FIG. 6), and/or between an interconnect tunnel component 504 and an adjacent interconnect cave component 506 (e.g., depicted as "hop 3", "hop 4", in FIG. 6). As further example, there can be a certain latency period (e.g., tRR ns, as depicted in FIG. 6) associated with transferring the read command and/or read data between the interconnect network component 104 and a memory component 102. In yet another example, there can be a certain latency period (e.g., tMA ns, as depicted in FIG. 6) associated with accessing (e.g., reading) data from a memory component 102.

Additional delay can be incurred during the access of the memory device 102, the reading of data stored in the memory device 102, and/or the transfer of data from the memory device 102 back to the interconnect network component 104. The read command information can be routed from the interconnect cave component 506 and passed to the memory component 102 via the interface component 508 so the read request can be processed, where the "memory read request" can take tRR nS to perform. Upon receiving the memory read request, the memory controller (not shown) can access the desired memory location(s) and can read the data therein, where the memory access can take tMA nS to complete, as illustrated in FIG. 6 (e.g., "memory read access"). The retrieved data can be transferred from the memory component 102 to the interconnect cave component 506, via the interface component 508, which can take tDT ns to perform, as depicted in FIG. 6 (e.g., the "memory data transfer")

The time taken to perform the three operations, "memory read request" (tRR), "memory read access" (tMA) and the "memory data transfer" (tDT) can be based in part on the speed of the interface component 508 between the interconnect cave 506 and the memory component 102, and/or the type of memory, for example. In order of data access times, solid-state memory devices can be faster than rotating magnetic storage devices; for example, a DRAM memory device can be faster than a flash memory; and a flash memory can be faster than a disk drive.

In the example illustrated in FIG. 6, the total time to process a read request can be approximately equal to 2000 nS+tRR+tMA+tDT, which can account for transferring a read request from the processor component 402 to the interconnect network component 104 and propagate through the interconnect network component 104 to the memory component 102, where the data can be read from the memory, and the read data can be returned to the processor component 402 through the interconnect network component 104. This total time can be considered to be the latency of the read process for the system. It is desirable to reduce and/or minimize this latency associated with read commands to facilitate improving the read performance and efficiency.

It is to be appreciated that, while certain latency time periods have been stated herein with respect to certain components and/or actions performed by such components, such latency time periods are provided for purposes of example only, and the actual latency time periods associated with such respective components can be more or less than the particular latency periods provided herein.

Figure 7:
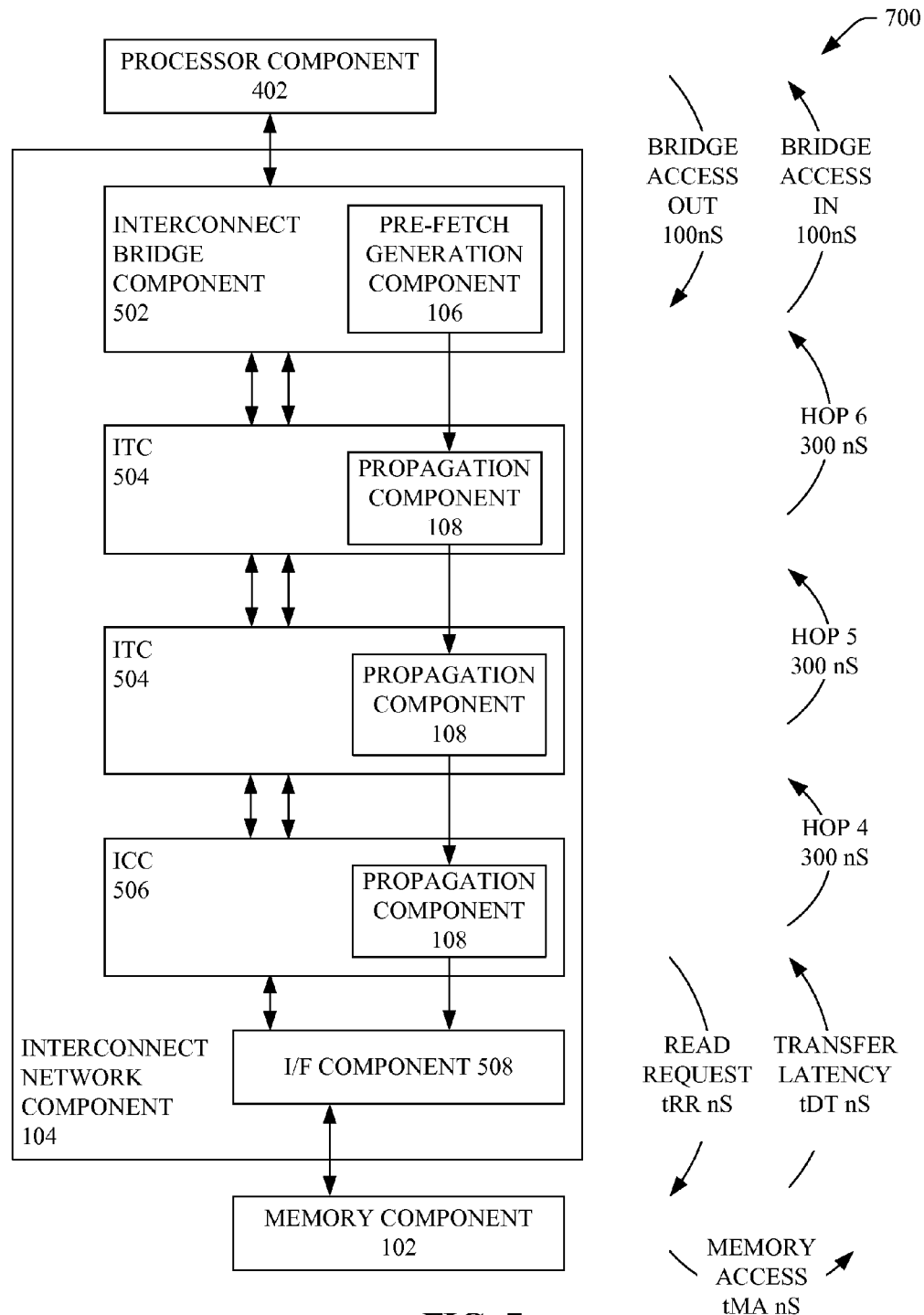
FIG. 7 illustrates a block diagram of a system that can employ pre-fetches to facilitate access of data associated with a memory in accordance with an aspect of the disclosed subject matter.

Turning to FIG. 7, illustrated is an exemplary system 700 that can access data from a memory in accordance with an aspect of the disclosed subject matter. System 700 can include a memory component 102, a pre-fetch generation component 106, propagation components 108, a processor component 402, an interconnect network component 104, an interconnect bridge component 502, interconnect tunnel components 504, an interconnect cave component 506, and an interface component 508, wherein each of these components can be the same or similar as, and/or can include the same or similar respective functionality, as respective components more fully described herein, for example, with regard to system 100, system 200, system 300, system 400, system 500, and/or system 600.

Conventionally, as more fully described with regard to system 600, there can be a latency period associated with the processing of a read command to read data from the memory component 102. For example, to send a read command from the processor component 402 to the interconnect network component 104 and then to the memory component 102, where the data can be read from the desired memory location(s) therein, and transmit the read data back through the interconnect network component 104 to the processor component 202 can be approximately equal to 2000 nS+tRR+tMA+tDT. The subject innovation can facilitate reducing and/or minimizing the data read latency period associated with conventional systems.

In accordance with one aspect of the disclosed subject matter, the pre-fetch generation component 106 can receive read command information and can generate a pre-fetch request based in part on the read command information. The pre-fetch request can be encoded and transmitted serially at very high speed embedded within the encoded clock signal, via the propagation components 108, as compared to the speed of transmission of the read command through the interconnect network component 104, to the memory component 102, where the pre-fetch request can be received by the memory component 102, which can read the desired data based in part on the pre-fetch request.

In accordance with an aspect, the read data can be temporarily stored in a buffer component (not shown) that can be in or associated with the memory component 102. When the read command is received by the memory component 102, the read command information can be compared with the information associated with the read data to ensure that the read data is the data desired by the read command. When it is confirmed that the read data is the desired data associated with the read command, the read data can be transmitted to the requesting component (e.g., processor component 402) via the interconnect network component 104.

By employing pre-fetch requests to facilitate reading data from a memory component 102 associated with the interconnect network 104, there can be a substantial reduction in the latency period between the processor component 402 generating the read command and the read data being provided to the processor component 402. For instance, in one aspect, given the example latency times associated with the interconnect network component 104 and memory component 102, when employing the pre-fetch request to facilitate a data read, the subject innovation can facilitate reducing the latency period by approximately tMA, which can range from, for example, approximately 200 nS to 1 mS for certain memory devices (e.g., certain flash memory devices), as the latency associated with accessing the data from the memory can be reduced and/or eliminated because the memory component 102 can read the data based in part on the pre-fetch request and can have the read data stored in a buffer component and ready to be transferred when the read command arrives at the memory component 102.

In accordance with another aspect of the disclosed subject matter, the read data latency period can be even further reduced if the read data is forwarded to the interconnect network component 104 prior to the read command reaching the memory component 102. In such instance, the read command and read data can converge at a component (e.g., interconnect tunnel component 504, interconnect cave component 506, etc.) within the interconnect network component 104, where it can be verified that the read data is associated with the read command. The read data can proceed to the requesting component and the read command can be discarded as the read request is already serviced.

For example, if the read data converges with the read command at the interconnect tunnel component 504 adjacent to the interconnect cave component 506, the conventional read latency period can be reduced by approximately 600 nS+tRR+tMA+tDT, as the time associated with accessing the data from the memory component and providing the data to the interconnect tunnel component 504 and the time for the read command to be transmitted from the interconnect tunnel component 504 to the memory component 102 can all be saved.

The reduction in read latency that can be achieved by employing a pre-fetch generation component 106 can be based in part on the type of memory component 102, the type of interconnect network component 104 (e.g., interconnect tunnel component 504, interconnect cave component 506, etc.), the number of interconnect tunnel components 504 and/or other components in the interconnect network component 104, the location of the memory component 102 with regard to its connection to the interconnect network component 104 and in relation to the requesting component (e.g., processor component 402), and/or the type of connection (e.g., wired, wireless), for example.

For instance, while two interconnect tunnel components 504 are depicted in system 700 (and system 600), it is to be appreciated that an interconnect network component 104 can have more or less than two interconnect tunnel components 504. As another example, if a first memory component 102 is connected to an interconnect tunnel component 504 that is closer to the processor component 402 than a second memory component 102, the amount of latency to process a read request can be less for the first memory component 102 than the second memory component 102. In an aspect, as the number of interconnect tunnel components 504 incorporated into the interconnect network component 104 increases, there can be a corresponding increase in the read latency associated with the conventional read process. Employing the pre-fetch generation component 106 can result in even further latency reduction benefits as the interconnect network component 104 increases in size.

In accordance with another embodiment, the pre-fetch generation component 106 can be contained within the processor component 402 (as illustrated in FIG. 4). Employing the pre-fetch generation component 106 in the processor component 402 can yield additional read latency reduction benefits, as there can be approximately 100 nS of latency time associated with transmitting the read command to the interconnect network component 104, which can be reduced and/or eliminated as a result of the pre-fetch generation component 106 generating pre-fetch requests from the processor component 402, as opposed to the pre-fetch generation component 106 waiting for the read command to reach the interconnect bridge component 502 before the pre-fetch generation component 106 receives the read command.

Figure 8:
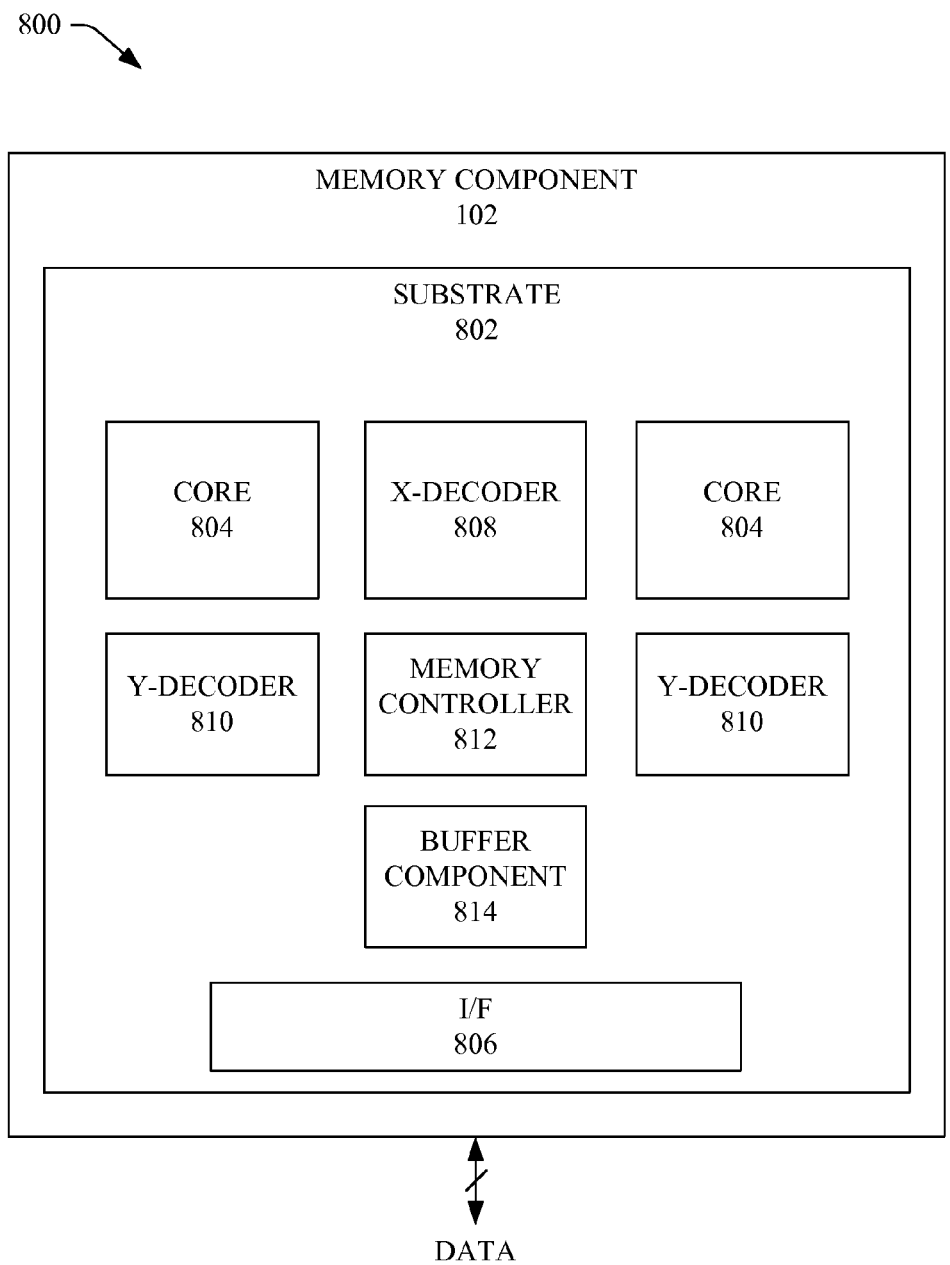
FIG. 8 depicts a block diagram of a system that can facilitate storage of data in accordance with an aspect of the disclosed subject matter.

Referring to FIG. 8, illustrated is a block diagram of a system 800 that can facilitate storage of data in accordance with the disclosed subject matter. In accordance with an aspect, the system 800 can be or can include a memory component 102 which can be a nonvolatile memory, such as, for example, a flash memory (e.g., single-bit flash memory, multi-bit flash memory), that can be created on a semiconductor substrate 802 in which one or more core regions 804, which can be higher-density core regions, and one or more peripheral regions, which can be lower-density regions, can be formed. The high-density core regions 804 can include one or more M by N arrays of individually addressable, substantially identical multi-bit memory cells (not shown). The memory cells in memory 102 can retain stored data even while disconnected from a power source.

The lower-density peripheral regions can typically include an interface component 806 (hereinafter also referred to as "I/F 806") and programming circuitry for selectively addressing the individual memory cells. The programming circuitry can be represented in part by and can include one or more x-decoders 808 and one or more y-decoders 810 that can co-operate with the I/F 806 for selectively connecting a source, gate, and/or drain of selected addressed memory cells to predetermined voltages or impedances to effect designated operations (e.g., programming, reading, erasing) on the respective memory cells, and deriving necessary voltages to effect such operations. Further, the I/F 806 can include and/or provide various adapters, connectors, channels, communication paths, etc. to integrate the system 800 into virtually any operating and/or database system(s) and/or with another system(s). In addition, I/F 806 can provide various adapters, connectors, channels, communication paths, etc., that can provide for interaction and/or communication with other components, data, and the like, associated with the system 800.

System 800 can also include a memory controller component 812 that can facilitate control of the flow of data to and from the memory 102. In one aspect, the memory controller component 812, by itself or in conjunction with a processor component (e.g., 202), can facilitate execution of operations (e.g., read, write, erase) associated with memory locations in the core(s) 804. In another aspect, the memory controller component 812 can facilitate verifying and/or maintaining the desired charge level(s) associated with data stored in the memory locations in the core(s) 804.

In another aspect, the memory controller component 812 can receive an encoded clock signal that can include a pre-fetch request and can obtain and/or derive the pre-fetch request from the encoded clock signal and can recover the clock signal. In still another aspect, the memory controller component 812 can facilitate servicing the pre-fetch request to read data stored in memory location(s) in the memory based in part on the pre-fetch request. In yet another aspect, the memory controller component 812 can facilitate comparing the read data with a received read command to determine whether the read data is associated with the read command.

In accordance with another aspect of the disclosed subject matter, the memory controller component 812 also can receive a read command and can read data based in part on the read command. For example, where data read based in part on a pre-fetch request is not associated with a read command, the memory controller component 812 can facilitate reading data from memory location(s) in a memory component 102 based in part on the read command.

System 800 can further contain a buffer component 814, which can be comprised of volatile memory (e.g., SRAM), that can be utilized as a temporary storage to store data being written to and/or read from the memory component 102. For example, in one aspect, when data is read from the memory component 102 based in part on a pre-fetch request, the read data can be stored in the buffer component 814 until provided to the interconnect network component 104 (not shown) to be provided to a requesting component (e.g., processor component 402) (not shown), or until otherwise provided.

Figure 9:
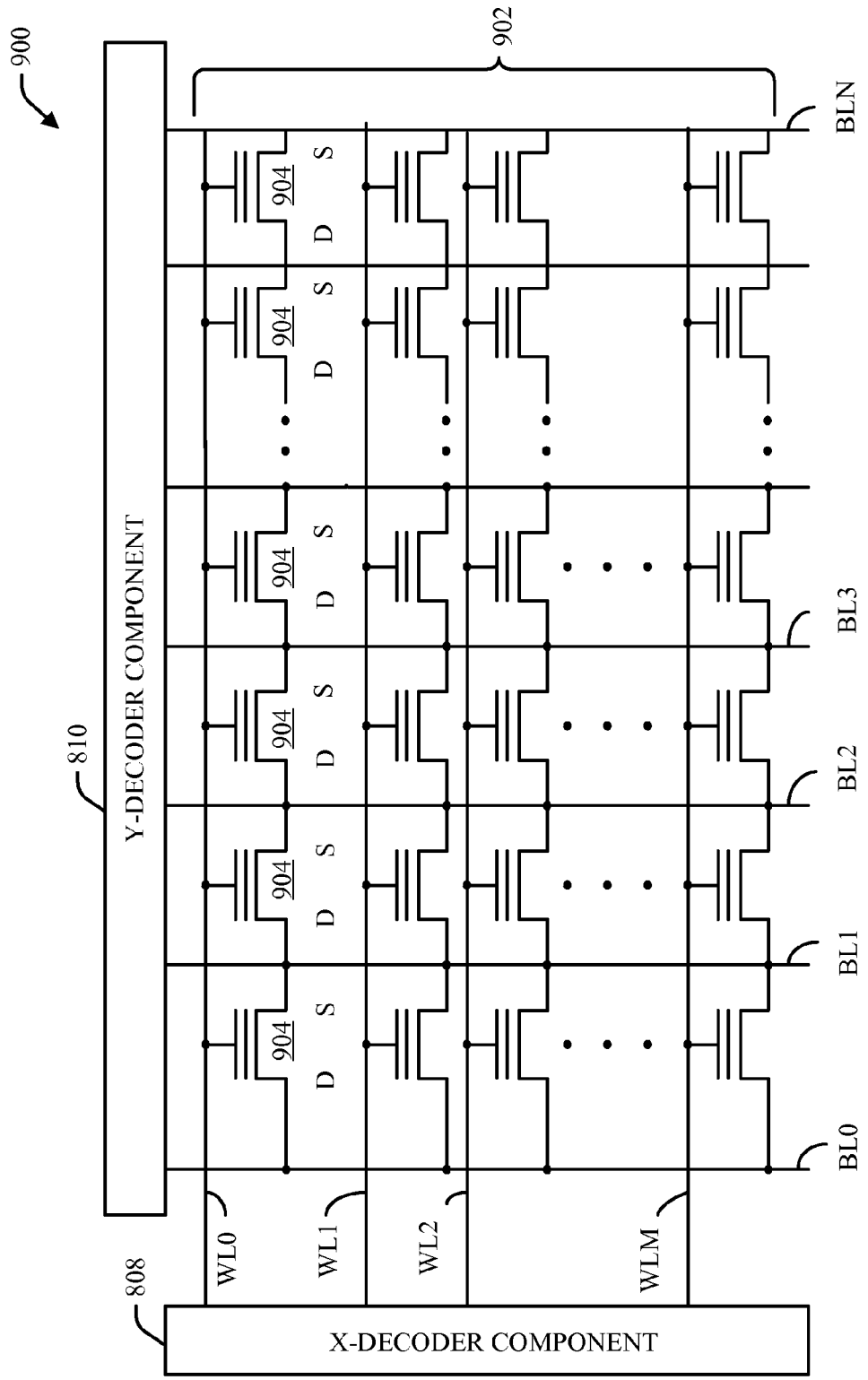
FIG. 9 illustrates a system that can facilitate storage of data in accordance with an aspect of the disclosed subject matter is illustrated.

Turning to FIG. 9, depicted is an exemplary diagram of a system 900 that can facilitate data storage in accordance with the disclosed subject matter. The system 900 can include a memory array(s) 902 that can include a plurality of memory cells 904 that each can be comprised of a drain, gate, and/or source. In accordance with an aspect, each memory cell 904 can be a multi-level cell, where data can be represented by the level of charge stored within the cell 904. In accordance with another aspect, one or more bits of data can be stored in each memory cell 904. The memory array 902 can be included in a memory component (e.g., 102), such as described in system 100, for example. In accordance with one embodiment, the system 900 can be part of a flash memory device. For example, a NOR flash memory and/or a NAND flash memory.

The system 900 can include an X-decoder component(s) 808 (e.g., word line (WL) decoder) and a Y-decoder component(s) 810 (e.g., bit line (BL) decoder) that can each respectively decode inputs/outputs during various operations (e.g., programming, reading, verifying, erasing) that can be performed on the memory cells 904. The X-decoder component 808 and Y-decoder component 810 can each receive address bus information from a processor (e.g., 402) and/or system controller (not shown) or the like, and can utilize such information to facilitate accessing or selecting the desired memory cell(s) 904 (e.g., memory location(s)) associated with the command. The memory cells 904 can be formed in M rows and N columns. A common WL can be attached to the gate of each memory cell 904 in a row, such as word-lines WL0, WL1, WL2, through WLM. A common BL can be attached to each cell 904 in a column, such as bit-lines BL0, BL1, through BLN. A WL can contain, for example, a plurality of elements (e.g., 512, 1024, 2048, etc.) forming multiple words. A sector can include a plurality of WLs, such as, for example, 512 WLs that can provide 512 k or more elements of memory. In accordance with an aspect of the disclosed subject matter, respective voltages can be applied to one or more memory cells 904 through the WLs and BLs to facilitate performing operations, such as program, read, erase, and the like.

It is to be appreciated that while the memory cells 904 are shown as being respectively associated with a drain and a source, in accordance with one embodiment, where a memory cell 904 contains charge storage elements on two sides of a transistor associated with a cell 904 that can each be programmed, the drain can act as the source, and/or the source can act as the drain, depending on which portion of the memory cell 904 is being charged during a given operation.

Figure 10:
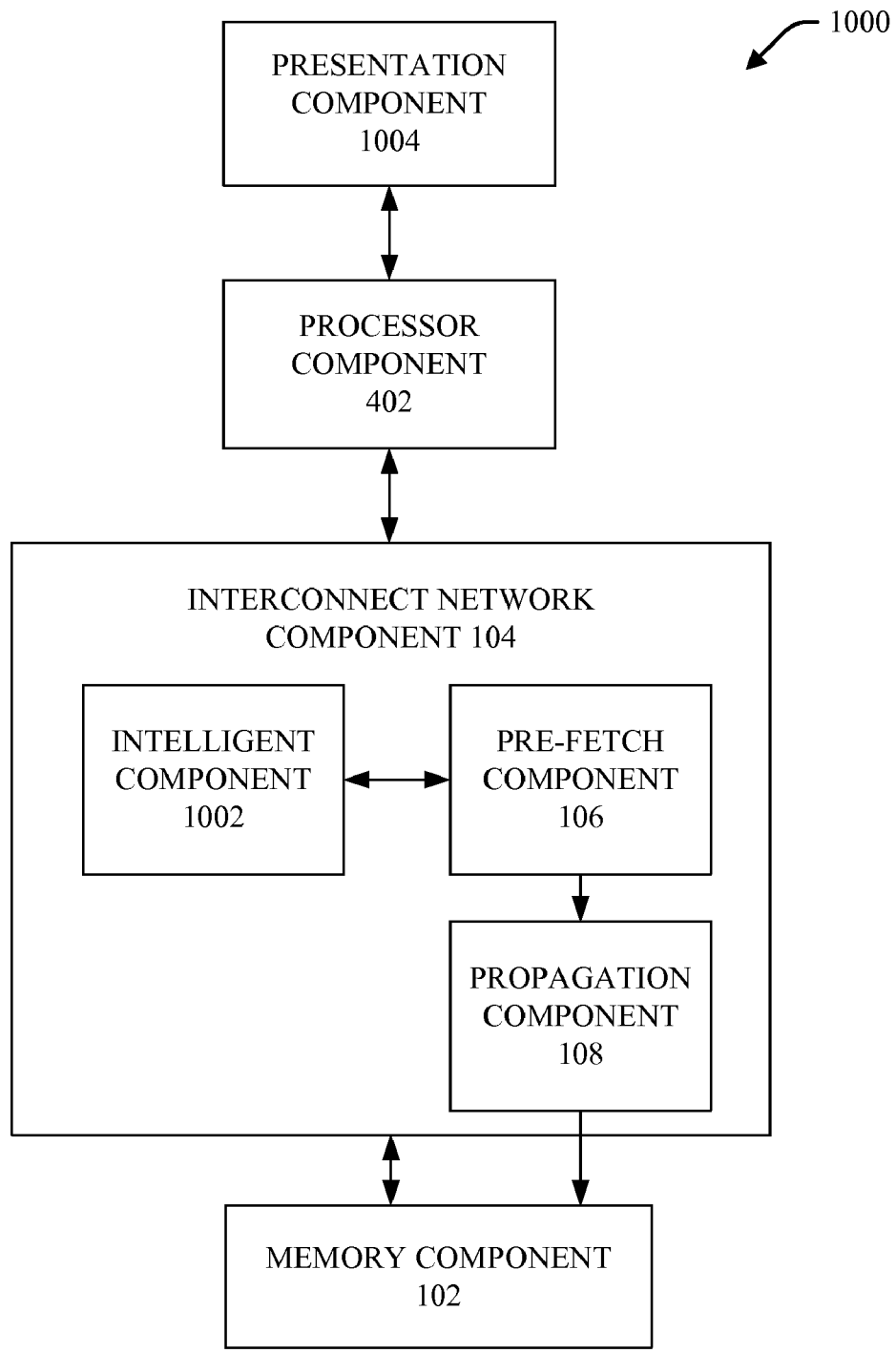
FIG. 10 illustrates a block diagram of a system that can employ intelligence to facilitate access of data associated with a memory in accordance with an aspect of the disclosed subject matter.

Turning to FIG. 10, depicted is a system 1000 that can employ intelligence to facilitate transmission of data in accordance with the disclosed subject matter. System 1000 can include a processor 402 and an interconnect network component 104, which can include a pre-fetch generation component 106, and a propagation component 108, that can facilitate transmitting data to or receiving data from a memory component(s) 102. The interconnect network component 104, the processor component 402, the pre-fetch generation component 106, the propagation component 108, and the memory component(s) 102, each can be substantially similar to respective components and can include such respective functionality as more fully described herein, for example, with regard to system 100, system 200, system 300, system 400, system 500, system 600, system 700, system 800 and/or system 900.

The system 1000 can further include an intelligent component 1002 that can be associated with the interconnect network component 104, and can analyze data, and based in part on such data, can make an inference(s) and/or a determination(s) regarding a pre-fetch request, whether data read as a result of a pre-fetch request is associated with a particular read command, whether read data has converged with a read command, whether a read command can be discarded, etc. In another aspect, the intelligent component can infer whether an automated function that can be performed by a component (e.g., interconnect network component 104) associated with system 1000, etc., can be performed based in part on current and/or historical evidence. For example, the intelligent component 1002 can evaluate current and/or historical information associated with an interconnect network component 104, and based in part on such information and/or predefined criteria, can make an inference as to whether data provided to the interconnect network component 104 by a memory component 102 to be sent to a requesting component (e.g., processor component 402) based in part on a pre-fetch request is associated with a read command received from a processor component 402 that is being transmitted to a memory component 102 associated with the interconnect network component 104.

It is to be understood that the intelligent component 1002 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 1000 also can include a presentation component 1004 that can present data associated with the processor 402 and/or other components associated with system 1000. It is to be appreciated that the presentation component 1004 can be incorporated into the processor 402 and/or a stand-alone unit. The presentation component 1004 can provide various types of user interfaces to facilitate interaction between a user and any component coupled to the processor 402.

The presentation component 1004 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, dropdown-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the processor 402.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

It is to be appreciated and understood that system 100, system 200, system 300, system 400, system 500, system 600, system 700, system 800, system 900 and/or system 1000, or a respective portion(s) thereof, can be incorporated in, can be associated with, and/or can include one or more electronic devices. Such an electronic device can include, but is not limited to, a computer, network equipment (e.g., routers, access points), a media player and/or recorder (e.g., audio player and/or recorder, video player and/or recorder), a television, a smart card, a phone, a cellular phone, a smart phone, an electronic organizer, a portable digital assistant (PDA), a portable email reader, a laptop computer, a digital camera, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with tamper-resistant chip(s), an embedded computer in a machine (e.g., an airplane, a copier, a motor vehicle), and the like.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 11-14 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example, acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 11:
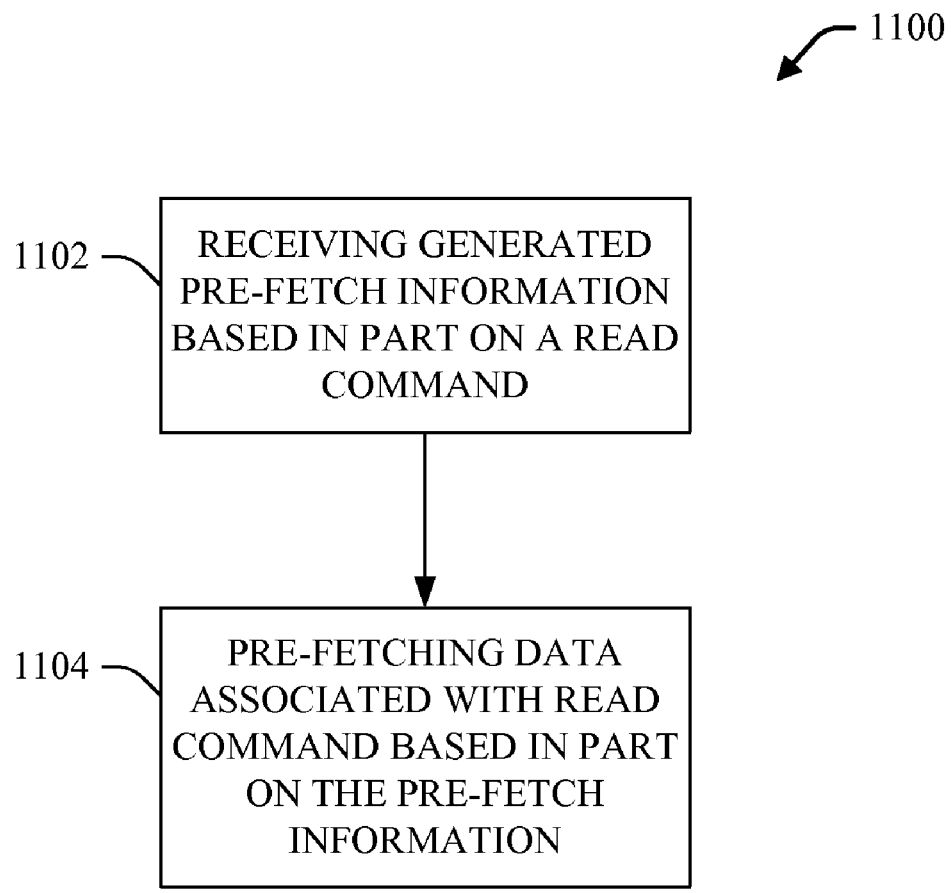
FIG. 11 illustrates a methodology that can facilitate generating pre-fetch information to facilitate accessing data associated with a memory in accordance with an aspect of the disclosed subject matter.

Referring to FIG. 11, illustrated is a methodology 1100 that can facilitate generating pre-fetch information to facilitate accessing data from a memory in accordance with an aspect of the disclosed subject matter. At 1102, generated pre-fetch information (e.g., a pre-fetch request(s)) can be received, where the generated pre-fetch information can be based in part on a read command. In one aspect, a memory component (e.g., 102) can receive the generated pre-fetch information, via a propagation component(s) (e.g., 108), directly from a pre-fetch generation component (e.g., 106) that can generate the pre-fetch information based in part on the read command. The read command can be a command to request data from the memory component, for example. The memory component can be associated with an interconnect network component (e.g., 104) that can have a plurality of components, including memory components, connected thereto. The read command can be provided to the interconnect network component, where the read command can be routed through the interconnect network component to the desired memory component to request data stored in that memory component.

In one aspect, the pre-fetch generation component can receive the read command information and can generate one or more pre-fetch requests, based in part on the read command, to facilitate reading the data from the memory component specified by the read command. The memory component, which can have the data desired by the read command, can receive the generated pre-fetch information directly from the pre-fetch component, via a propagation component, as opposed to receiving the read command that can be transmitted through the interconnect network component to the memory component.

At 1104, data associated with a read command can be pre-fetched based in part on the pre-fetch information. In accordance with one aspect, the data associated with the read command can be stored in memory location(s) in the memory component. The memory component can receive the pre-fetch information and can access the memory location(s) containing the desired data and can read the data from the memory location(s).

In one aspect, the read data can be stored in a buffer component (e.g., 814) in the memory component, where the read data can reside until the associated read command is received by the memory component. Information associated with the read data can be compared to the read command information to determine whether the read data is the data desired by the read command. Once it is verified that the data is the data desired by the read command, the data can be transmitted to the destination specified by the requesting component (e.g., processor component 402). The subject innovation can provide an improved read performance, as the data can be pre-fetched from the memory location(s) and held in the buffer component ready to be transmitted to its destination, which can result in a reduction in the read latency period associated with processing the read request conventionally, where the data is not read from the memory until the read command is received.

In accordance with another aspect, after the data is read from the memory location(s), the read data can be provided to the interconnect network component to be transmitted to the desired destination. This can occur while the read command is still being transmitted through the interconnect network component to the memory component. At some point within the interconnect network component, the read data can converge with the read command, for example, at an interconnect tunnel component (e.g., 504). At the convergence point, the component at the convergence point can confirm that the read data is associated with the read command, for instance, by comparing information (e.g., memory address, memory device) associated with the read data to corresponding information associated with the read command. Once it is confirmed that the read data is associated with the read command, the read data can continue to its destination (e.g., processor component), and the read command can be discarded, since the read request has already been fulfilled based in part on the pre-fetch information (e.g., pre-fetch request).

As a result, the subject innovation can provide a significant reduction in the read latency period associated with the processing of the read command, as a portion of the latency associated with the read command being transmitted to the memory component through the interconnect network component can be reduced and/or eliminated since the read command can be discarded at the convergence point, the latency associated with accessing the memory and transmitting the read data from the memory component to the interconnect network component can also be reduced and/or eliminated as the data can be read and provided to the interconnect network component prior to the read command being transmitted to the memory component, and a portion of the latency associated with transmitting the read data to the desired destination via the interconnect network component can be reduced and/or eliminated, as the read data already can be within the interconnect network component and en route to its destination when the read data converges with the read command. At this point, methodology 1100 can end.

Figure 12:
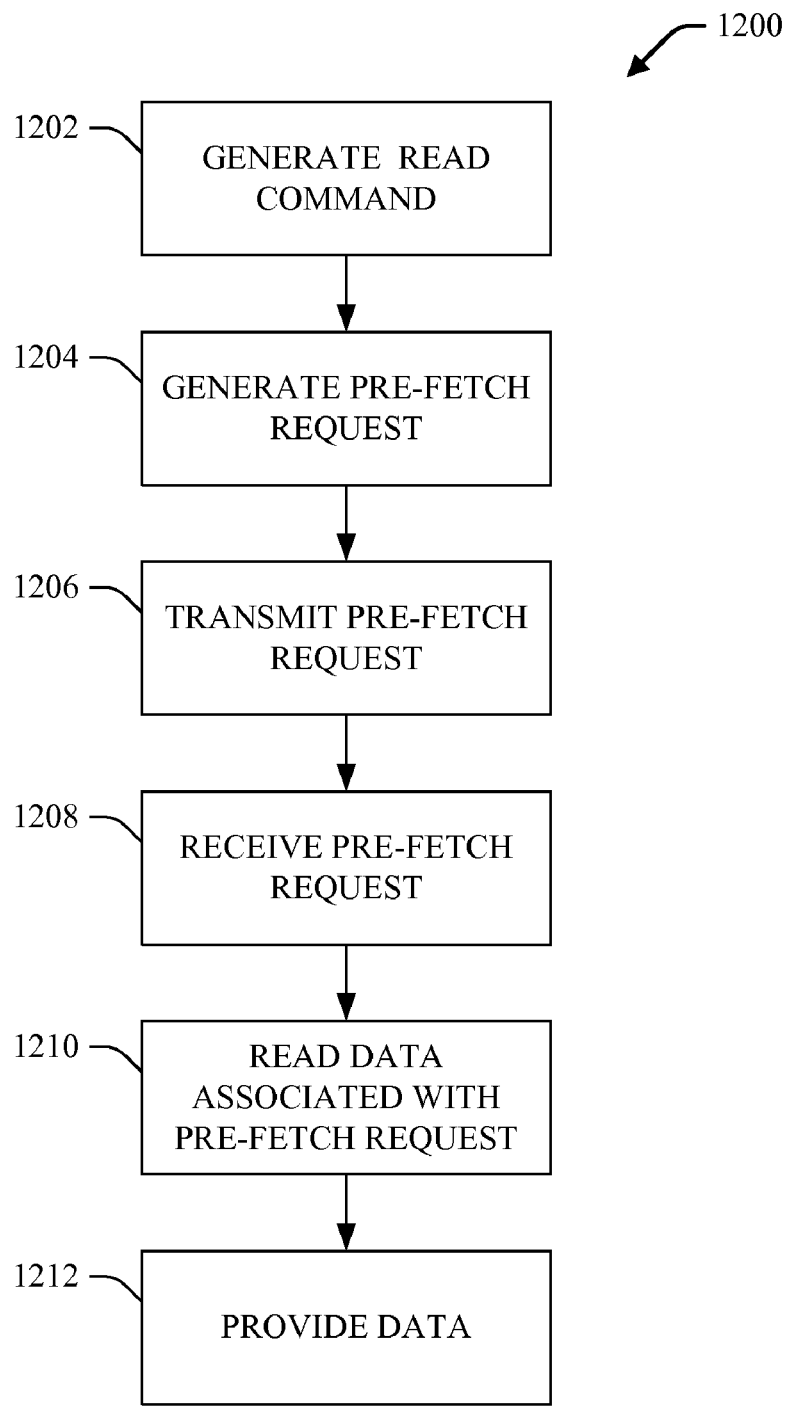
FIG. 12 depicts a methodology that can generate pre-fetch requests to facilitate reading data associated with a memory in accordance with an aspect of the disclosed subject matter.

FIG. 12 depicts a methodology 1200 that can generate a pre-fetch request(s) to facilitate reading data from a memory in accordance with an aspect of the disclosed subject matter. At 1202, a read command(s) can be generated. In one aspect, a processor component (e.g., 402) can generate commands, including read, write, and/or erase commands. The processor component can be associated with (e.g., connected to) an interconnect network component (e.g., 104) that can have a plurality of components, including memory components (e.g., 102), connected thereto. The processor component can generate the read commands to read data from the memory components. The read command can include information that can facilitate the reading of data, as the read command can include information regarding, for example, the memory component in which the desired data is stored, the memory address(es) in the memory component in which the data is stored, the destination where the desired data should be sent, bus information, etc.

At 1204, a pre-fetch request(s) can be generated based in part on the read command. In one aspect, a pre-fetch generation component (e.g., 106) can receive the read command(s) and can generate pre-fetch request(s) based in part on information associated with the read command(s). In accordance with an aspect, a pre-fetch request can include a subset of the information associated with the read command. The pre-fetch request can include information regarding the memory component and/or memory address(es) from which the data can be read, bus information, and destination information regarding where the read data can be sent. In accordance with another aspect, the pre-fetch generation component can facilitate coding (e.g., encoding) a subset of the read command information to generate the pre-fetch request, where the pre-fetch request can be incorporated with the clock signal during encoding of the clock signal and pre-fetch request. The encoded clock signal, which can contain the pre-fetch request, can be transmitted serially at a high rate of speed, as compared to the transmission speed of the read command. In one embodiment, the pre-fetch request can be coded using 8b10b technology, which can allow the pre-fetch request to be transmitted at a rate that can be much higher than the rate at which the read command can be transmitted via the interconnect network component.

At 1206, the pre-fetch request(s) can be transmitted. In accordance with one aspect, the pre-fetch generation component can transmit the pre-fetch request(s) directly to the memory components (e.g., 102) associated with the interconnect network component. In another aspect, the pre-fetch request(s) can be transmitted directly to the memory components via a serial link transmission circuit (e.g., a series of propagation components) at a predetermined transmission rate that can be a much higher rate than the transmission rate associated with transmitting the read command via the interconnect network component.

In still another aspect, the pre-fetch request(s) can be coded so that the pre-fetch request(s) can be transmitted with the clock signal, which can be received by the pre-fetch generation component, that can be provided to components, including memory components, associated with the interconnect network component and used to synchronize such components. For example, the read command can be a 64-bit data packet structured in 8-bit chunks of data, and the 8-bit read command information can be coded so that it is 10-bit coded data, where the extra bits can facilitate clock recovery and error recovery. The clock signal can be configured to run at one predetermined rate of speed (e.g., 400 MHz, 800 MHz), while the pre-fetch request can be structured so that it can be transmitted at a much higher predetermined rate of speed (e.g., 3 GHz, 6 GHz).

In accordance with another aspect, the encoded clock signal can be transmitted through a clock pin(s) associated with the pre-fetch generation component and can be broadcast to every component (e.g., propagation component, memory component) connected to the pre-fetch generation component and associated with the interconnect network component, where the clock signal, with the pre-fetch request(s) encoded therein, can be provided to the memory component in which the desired data is stored. In yet another aspect, the encoded clock signal can be transmitted serially outside of the interconnect network component, via propagation component(s) and can thereby bypass components associated with the interconnect network component, such as the interconnect tunnel component (e.g., 504) and/or interconnect cave component (e.g., 506), for example, that can be between the pre-fetch generation component and the memory component. The generating and transmitting of the pre-fetch request can be performed in a relatively negligible amount of time, as compared to the length of time that it can take for a read command to navigate through the interconnect network component to the appropriate memory component.

At 1208, the pre-fetch request(s) can be received. In one aspect, the propagation component(s) can receive the pre-fetch request(s) and forward the pre-fetch request(s) on to the memory component(s). The pre-fetch request can be received by the propagation component(s) as part of an encoded clock signal (e.g., clock signal encoded with the pre-fetch request(s) based in part on 8b10b technology). In another aspect, the clock signal can be recovered from the encoded clock signal, and the pre-fetch request(s) can be recovered, by the propagation component(s), from the encoded clock signal as well, with the recovered pre-fetch request(s) being forwarded by the propagation component(s) to the memory component(s). It is to be appreciated that the pre-fetch request can be provided to all memory components to which the encoded clock signal is provided. However, the pre-fetch request can contain information identifying the particular memory component in which the desired data is stored. The particular memory component can facilitate processing the pre-fetch request, while the other memory components can disregard the pre-fetch request, since those memory components are not identified in the pre-fetch request.

At 1210, data associated with the pre-fetch request can be read. In one aspect, data associated with memory address(es) in the pre-fetch request can be read from the memory location(s), associated with the memory address(es), in the memory component identified in the pre-fetch request. In one aspect, a memory controller component (e.g., 812) can facilitate processing the pre-fetch request and can access the memory location(s) identified in the pre-fetch request and the data stored therein can be read. In accordance with another aspect, the read data can be temporarily stored in a buffer component (e.g., 814) until transmitted to its destination.

At 1212, the read data can be provided. In one aspect, the memory component can provide the read data to the interconnect network component where the read data can be transmitted to the destination specified in the pre-fetch request and/or read command. In another aspect, if the data is read and placed in the buffer component prior to the read command arriving at the memory component, the read data can be provided by the memory component to the interconnect network component, and the read data can converge with the read command while in the interconnect network component, for example, at an interconnect tunnel component (e.g., 504), where there can be a verification that the read data is the data specified by the read command, for example, based in part on a comparison of respective memory component and/or memory address information. If the read data is the data specified by the read command, the transmission of the read data can continue to the destination, and the read command can be discarded. If the read data does not correspond to the read command, the read data can be discarded, and the read command can proceed to the memory component so that the read request can be serviced.

In accordance with another aspect, the read data can reside in the buffer component until the read command is presented to the memory component. The memory controller component can compare the read command information with the information associated with the read data to determine whether the read data is the data specified by the read command. If the read data is associated with the read command, the read data can be provided to the interconnect network component, where the read data can be routed to the destination specified in the read command. If the read data does not correspond to the read command, the read data can be discarded, or can remain in the buffer component until replaced by other data.

By generating pre-fetch requests and utilizing such requests to pre-fetch data from memory components associated with the interconnect network component, the subject innovation can facilitate improved read performance, as latencies associated with processing read commands through the interconnect network component can be significantly reduced. At this point, methodology 1200 can end.

Figure 13:
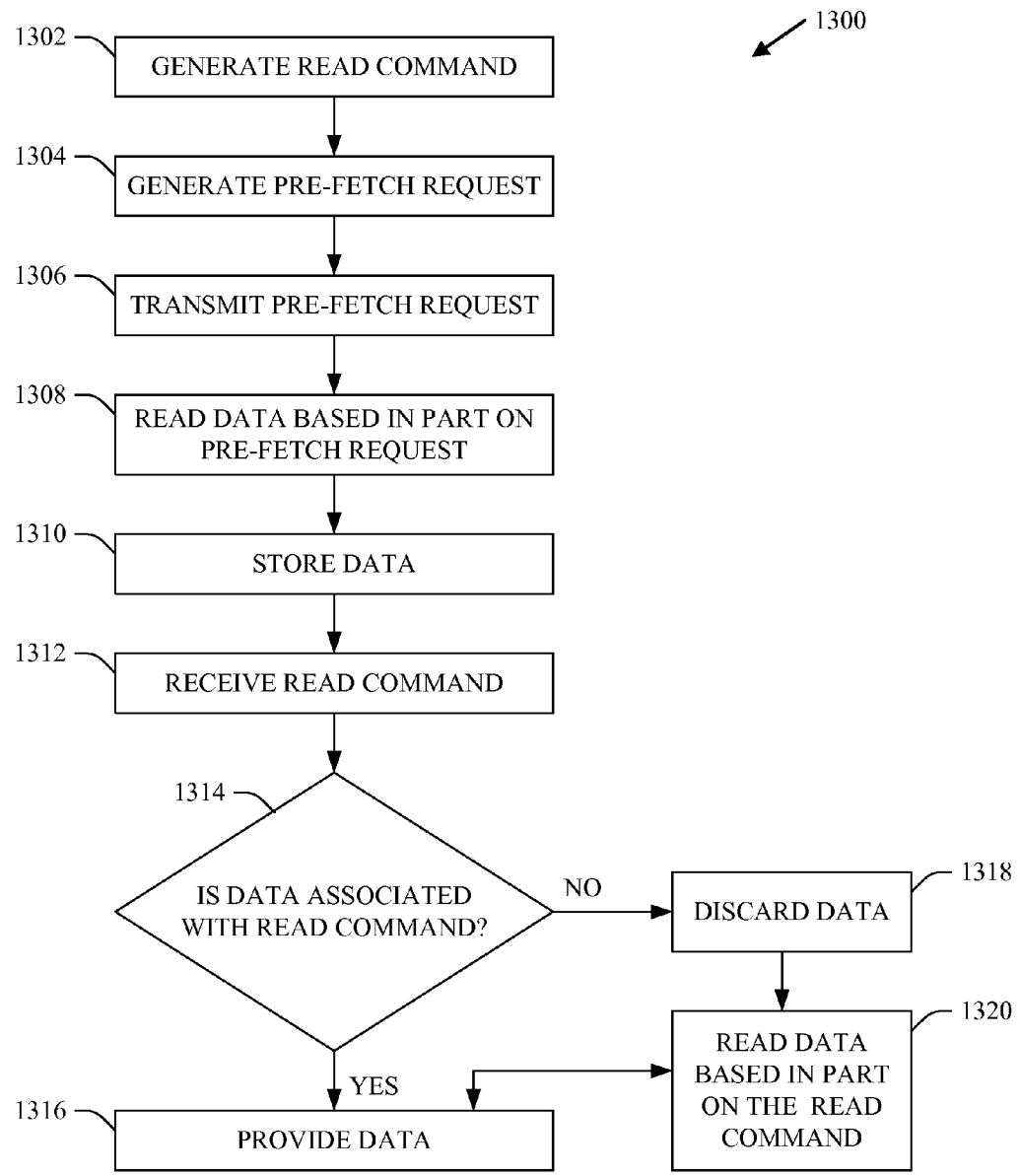
FIG. 13 illustrates a methodology that can generate pre-fetch requests to facilitate access of data associated with a memory in accordance with an aspect of the disclosed subject matter.

Turning to FIG. 13, depicted is a methodology 1300 that can generate pre-fetch requests to facilitate accessing data associated with a memory in accordance with an aspect of the disclosed subject matter. At 1302, a read command(s) can be generated. In one aspect, a processor component (e.g., 402) can generate commands, including read, write, and/or erase commands. The processor component can be associated with (e.g., connected to) an interconnect network component (e.g., 104), and the interconnect network component can have a plurality of components, such as memory components (e.g., 102), that can be associated (e.g., connected) therewith. The processor component can generate read commands to read data from the memory components associated with the interconnect network component. The read command can include information that can facilitate the reading of data, as the read command can include information regarding, for example, the memory component in which the desired data is stored, the memory address(es) in the memory component in which the data is stored, the destination where the desired data should be sent, bus information, as well as other information.

At 1304, a pre-fetch request(s) can be generated based in part on the read command. In one aspect, a pre-fetch generation component (e.g., 106) can receive the read command and can generate a pre-fetch request based in part on information associated with the read command. In accordance with an aspect, a pre-fetch request can include a subset of the information associated with the read command. The pre-fetch request can include, for example, information regarding the memory component and/or memory address(es) from which the data can be read, bus information, and/or destination information regarding where the read data can be sent. In accordance with another aspect, the pre-fetch generation component can facilitate coding (e.g., encoding using 8b10b technology) a subset of the read command information to generate the pre-fetch request, where the pre-fetch request, can be associated with a clock signal that can be provided to components, such as a propagation component(s) (e.g., 108) and memory components associated with the pre-fetch generation component, and/or the interconnect network component.

For example, the read command can be a 64-bit data packet structured in 8-bit chunks of data, and the 8-bit read command information can be encoded so that it is 10-bit coded data, in accordance with an 8b10b format, where the extra bits can facilitate clock recovery and/or error recovery. The clock signal can be configured to operate at one predetermined rate of speed (e.g., 400 MHz), while the pre-fetch request can be structured so that it can be transmitted at a much higher predetermined rate of speed (e.g., 3 GHz, 6 GHz).

At 1306, the pre-fetch request(s) can be transmitted. In accordance with one aspect, the pre-fetch generation component can transmit the pre-fetch request(s) directly to the memory components (e.g., 102) associated with the pre-fetch generation component and/or interconnect network component. In another aspect, the pre-fetch request(s), as part of the encoded clock signal, can be transmitted directly to the propagation component(s) via a serial link transmission circuit at a predetermined transmission rate (e.g., 3 GHz, 6 GHz) that can be a much higher rate than the transmission rate associated with transmitting the read command via the interconnect network component.

In accordance with another aspect, the encoded clock signal can be transmitted through a clock pin(s) associated with the pre-fetch generation component and can be broadcast to components (e.g., propagation component) connected to the pre-fetch generation component and/or associated with the interconnect network component, where the encoded clock signal, with the pre-fetch request(s) encoded therein, can be directly provided to the memory component in which the data associated with the pre-fetch request is stored. As the encoded clock signal can be transmitted via the clock pin(s) associated with the pre-fetch generation component, the encoded clock signal can be transmitted serially outside of the interconnect network component, via a propagation component(s), and can thereby bypass components associated with the interconnect network component, such as the interconnect tunnel component (e.g., 504) and/or interconnect cave component (e.g., 506), for example, that can be between the pre-fetch generation component and the memory component. In one aspect, the generating and transmitting of the pre-fetch request can be performed in a relatively negligible amount of time, as compared to the length of time that it can take for a read command to navigate through the interconnect network component to the appropriate memory component.

In yet another aspect, the pre-fetch generation component can broadcast the encoded clock signal to the propagation components and memory components associated therewith. The propagation component and the memory component, attached to the propagation component, specified in the pre-fetch request, which can be contained in the encoded clock signal, can determine that the pre-fetch request relates to data stored in that memory component and can process the pre-fetch request. Other propagation components and memory components can also receive the encoded clock signal, but each of the other propagation components and memory components can determine that the pre-fetch request is not directed to them and can disregard the pre-fetch request.

At 1308, data associated with the pre-fetch request can be read. In one aspect, a propagation component can receive the encoded clock signal and can recover the clock signal and the pre-fetch request from the encoded clock signal, and forward the recovered pre-fetch request to a memory controller component (e.g., 812). Data stored in memory location(s) associated with memory address(es) that can be specified in the pre-fetch request can be read from such memory location(s) in the memory component identified in the pre-fetch request. In one aspect, the memory controller component can facilitate processing the pre-fetch request by accessing the memory location(s) reading the data stored therein.

At 1310, the data read from the memory location(s) can be stored. In accordance with one aspect, the read data can be temporarily stored in a buffer component (e.g., 814). At 1312, the read command can be received. In one aspect, the read command can be received by the memory component associated with the read command (e.g., memory component specified in the read command) from the interconnect network component.

At 1314, a determination can be made as to whether the read data is associated with the read command. For example, the memory controller can compare information associated with the read data, such as memory address information, and can compare such information to information (e.g., memory address information) associated with the read command to see if the read data was read from the memory location(s) specified in the read command. If it is determined that the read data is associated with the read command, at 1316, the read data can be provided. In one aspect, the read data can be retrieved from the buffer component and provided as an output from the memory component to the interconnect network component, where the read data can be provided to the destination (e.g., processor component) as specified in the read command and/or pre-fetch request.

If, at 1314, it is determined that the read data is not associated with the read command, then, at 1318, the read data can be discarded. In one aspect, the incorrect read data can be discarded by removing such data from the buffer component. In another aspect, the incorrect read data can remain in the buffer component until replaced with other data.

At 1320, data can be read based in part on the read command. In one aspect, the data can be read from the memory location(s) associated with memory address information contained in the read command. Methodology 1300 can return to reference numeral 1316, as the new read data, associated with the read command, can be provided as an output. In accordance with an aspect, the read data can be provided to the interconnect network component, where such read data can be provided to the destination (e.g., processor component) as specified in the read command.

Employing pre-fetch requests to pre-fetch data from memory components associated with the interconnect network component can facilitate improved read performance, as latencies associated with processing read commands through the interconnect network component can be significantly reduced. For example, latency associated with accessing the data stored in the memory can be reduced and/or eliminated, as the desired data can be read from the memory location(s) and placed in the buffer component prior to the read command arriving at the memory component, or at least the process of accessing the memory location(s) can begin prior to the read command arriving at the memory component. At this point, methodology 1300 can end.

Figure 14:
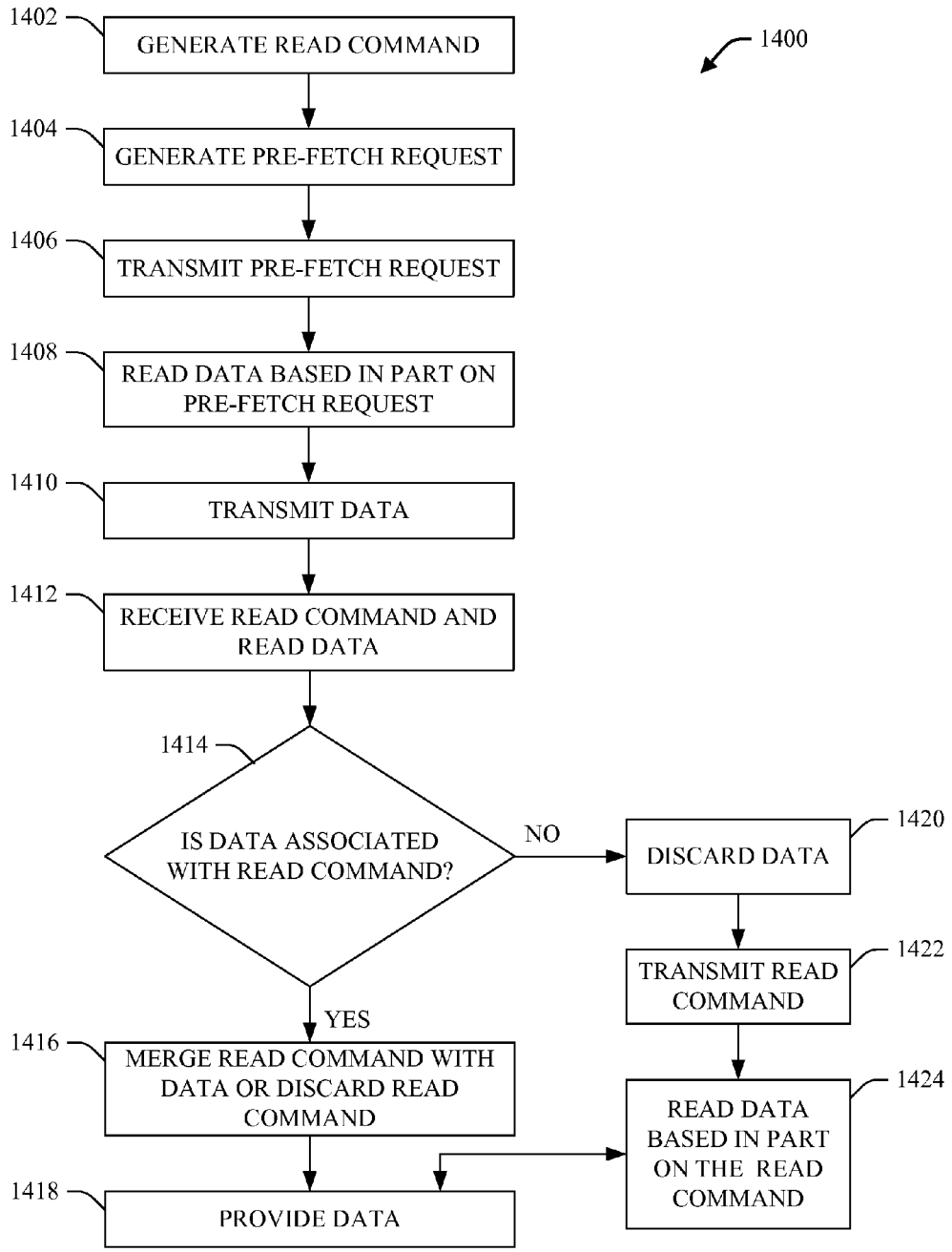
FIG. 14 depicts a methodology that can generate pre-fetch requests to facilitate reading data associated with a memory in accordance with an aspect of the disclosed subject matter.

Turning to FIG. 14, depicted is a methodology 1400 that can generate pre-fetch requests to facilitate reading data from a memory in accordance with an aspect of the disclosed subject matter. At 1402, a read command(s) can be generated. In one aspect, a processor component (e.g., 402) can generate commands, such as read, write, and/or erase commands. The processor component can be associated with (e.g., connected to) an interconnect network component (e.g., 104), which can have a plurality of components, such as memory components (e.g., 102), associated (e.g., connected) therewith. The read command can be comprised of information that can facilitate reading data from the memory components. For instance, a read command can include information regarding the memory component in which the desired data is stored, the memory address(es) in the memory component in which the data is stored, the destination where the desired data should be sent, bus information, and/or other information.

At 1404, a pre-fetch request(s) can be generated based in part on the read command. In one aspect, a pre-fetch generation component (e.g., 106) can receive the read command and can generate a pre-fetch request based in part on information associated with the read command. In accordance with an aspect, a pre-fetch request can include a subset of the information associated with the read command. The pre-fetch request can include, for example, information regarding the memory component and/or memory address(es) from which the data can be read, bus information, and/or destination information regarding where the read data can be sent. In another aspect, the pre-fetch generation component can facilitate encoding (e.g., employing an 8b10b format) a portion of the read command information to generate the pre-fetch request, where the pre-fetch request can be associated with a clock signal that can be provided to components, such as propagation components (e.g., 108) and/or memory components associated with the pre-fetch generation component and/or the interconnect network component.

At 1406, the pre-fetch request(s) can be transmitted. In accordance with one aspect, the pre-fetch generation component can transmit the pre-fetch request(s), via the propagation components, to the memory components (e.g., 102) associated with the pre-fetch generation component and/or interconnect network component. In another aspect, the pre-fetch request(s), as part of the encoded clock signal, can be transmitted (e.g., broadcast) to the propagation components via a clock pin(s) associated with the pre-fetch generation component through a serial link transmission circuit at a predetermined transmission rate (e.g., 3 GHz, 6 GHz) that can be a much higher rate than the transmission rate associated with transmitting the read command via the interconnect network component, where the encoded clock signal can bypass components associated with the interconnect network component.

The memory component specified in the pre-fetch request, which can be contained in the encoded clock signal, can determine that it is the memory component associated with the pre-fetch request and can process such request. Other memory components can also receive the encoded clock signal, but each of the other memory components can determine that the pre-fetch request is not directed to them and can disregard the pre-fetch request.

At 1408, data associated with the pre-fetch request can be read. In one aspect, a propagation component (e.g., 108) can receive the encoded clock signal and can recover the clock signal and the pre-fetch request from the encoded clock signal and forward the pre-fetch request information to a memory controller component (e.g., 812). Data stored in memory location(s) associated with memory address(es) that can be specified in the pre-fetch request can be read from such memory location(s) in the memory component identified in the pre-fetch request. In one aspect, the memory controller component can facilitate processing the pre-fetch request by accessing the memory location(s) and reading the data stored therein.

At 1410, the data read from the memory location(s) can be transmitted. In one aspect, the memory controller component can facilitate transmitting the data from the memory component to the interconnect network component. At 1412, the read command and read data can be received. In one aspect, a component in the interconnect network component, such as an interconnect tunnel component or an interconnect cave component can receive the read command as it is being routed to the memory component specified in the read command and can also receive the read data as such data is being transmitted to the destination specified in the pre-fetch request.

For instance, the read command and the read data can converge at a component in the interconnect network component. The read command and read data can arrive at such component at substantially the same time or at different times. For example, the read command can be received by an interconnect tunnel component and routed to the next component in the interconnect network component, the read data can be received at the same interconnect tunnel component, which can still have the information associated with the read command.

At 1414, a determination can be made as to whether the read data is associated with the read command. For example, the component in the interconnect network component that received the read command and the read data can compare information associated with the read data, such as information identifying the memory address and memory component from which the data was read, and can compare such information to read command information (e.g., information identifying the memory address and memory component from which the data is to be read) to see if the read data was read from the memory location(s) and memory component specified in the read command. If it is determined that the read data is associated with the read command, at 1416, the read command can be merged with the read data or can be discarded. In one aspect, the read command can be discarded because the read request is already serviced. In another aspect, the read command can be merged with the read data to facilitate routing the read data to its destination. At 1418, the read data can be provided. In one aspect, the read data can be transmitted from the component in the interconnect network component provided to the destination (e.g., processor component) as specified in the read command and/or pre-fetch request.

If, at 1414, it is determined that the read data is not associated with the read command, then, at 1420, the read data can be discarded. In one aspect, the incorrect read data can be discarded by removing such data from a temporary storage in the component of the interconnect network component. In another aspect, the incorrect read data can remain in the temporary storage until replaced with other data.

At 1422, the read command can be transmitted. For example, the read command can be transmitted from the component in the interconnect network component and routed to the memory component specified in the read command. At 1424, data can be read based in part on the read command. In one aspect, the data can be read from the memory location(s) associated with memory address information contained in the read command. At this point, methodology 1400 can return to reference numeral 1418, as the new read data, associated with the read command, can be provided as an output. In accordance with an aspect, the read data can be provided to the interconnect network component, where such read data can be provided to the destination (e.g., processor component) as specified in the read command. At this point, methodology 1400 can end.

Figure 15:
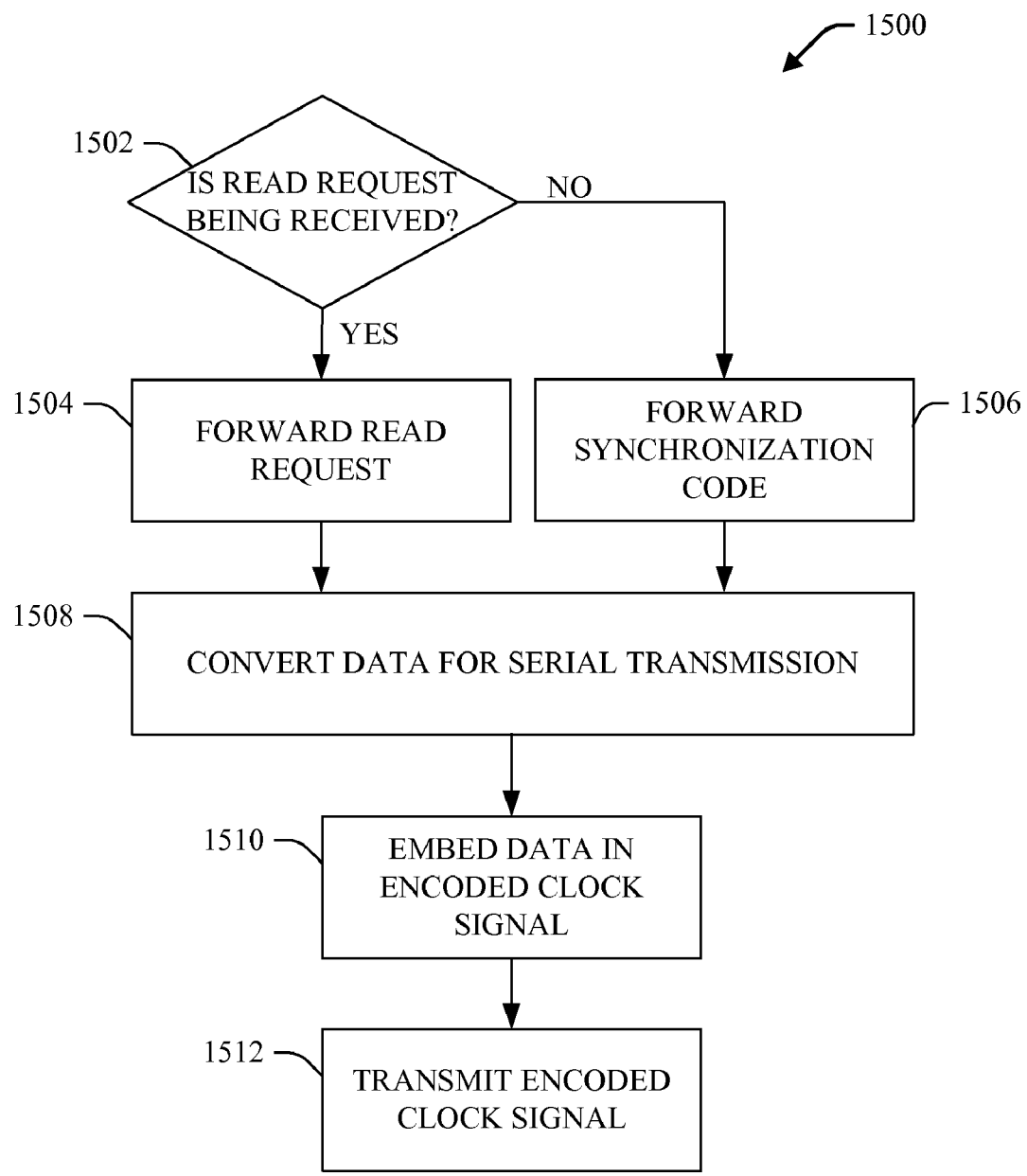
FIG. 15 illustrates a methodology that can facilitate generating an encoded clock signal comprising pre-fetch requests to facilitate reading data associated with a memory in accordance with an aspect of the disclosed subject matter.

Referring to FIG. 15, depicted is a methodology 1500 that can generate encoded clock signals comprising pre-fetch requests to facilitate reading data from a memory in accordance with an aspect of the disclosed subject matter. At 1502, a determination can be made as to whether a read request is being received. In one aspect, a pre-fetch generation component (e.g., 106) can comprise a mux component (e.g., 206) that can detect whether a read request is input into the mux component. If it is determined that a read request is received, at 1504, the read request can be loaded. In one aspect, the mux component can output the read request to a register component (e.g., 202), and the read request can be loaded in parallel into the register component. If, at 1502, it is determined that a read request is not received, at 1506, synchronization information (e.g., a synchronization pattern or code) can be loaded. In one aspect, synchronization information can be provided by a synchronization component (e.g., 208), and the mux component can facilitate providing the synchronization information to the register component, where the synchronization information can be loaded into the register component in parallel.

At 1508, the data, such as the read request and/or synchronization information, can be converted to facilitate serial transmission. In one embodiment, 8b10b techniques can be utilized to convert the read request and/or synchronization information from 8-bit based data, which is transmitted in parallel, to 10-bit based data that can be transmitted as a serial bit stream.

At 1510, the data, such as the converted read request and/or synchronization information, can be embedded in the clock signal, as the clock signal can be an encoded clock signal. In one aspect, the read request and/or synchronization information can be inserted in available regions of the clock signal such that the clock signal can be encoded with the read request and/or synchronization code. For example, the data can be embedded such that the clock signal can be at 300 MHz and the packets of data (e.g., converted read request and/or synchronization information) can be transmitted at rates of 3 GHz or more as part of the encoded clock signal.

At 1512, the encoded clock signal can be transmitted. In one aspect, the encoded clock signal can be transmitted via a serial transmission line (e.g., via a clock pin and serial path associated therewith) and can be broadcast to all components (e.g. memory components 102 via propagation components 108) associated with the pre-fetch generation component. The data packets can be broadcast at a very high rate of speed (e.g., 3 GHz or more) which can allow the data packets to reach its destination (e.g., memory component 102) very quickly, as compared to the rate of speed for a read request proceeding through conventional channels in the interconnect network component (e.g., 104) to a destination, where there can be latencies associated with each hop through the interconnect network component, for instance. At this point, methodology 1500 can end.

Figure 16:
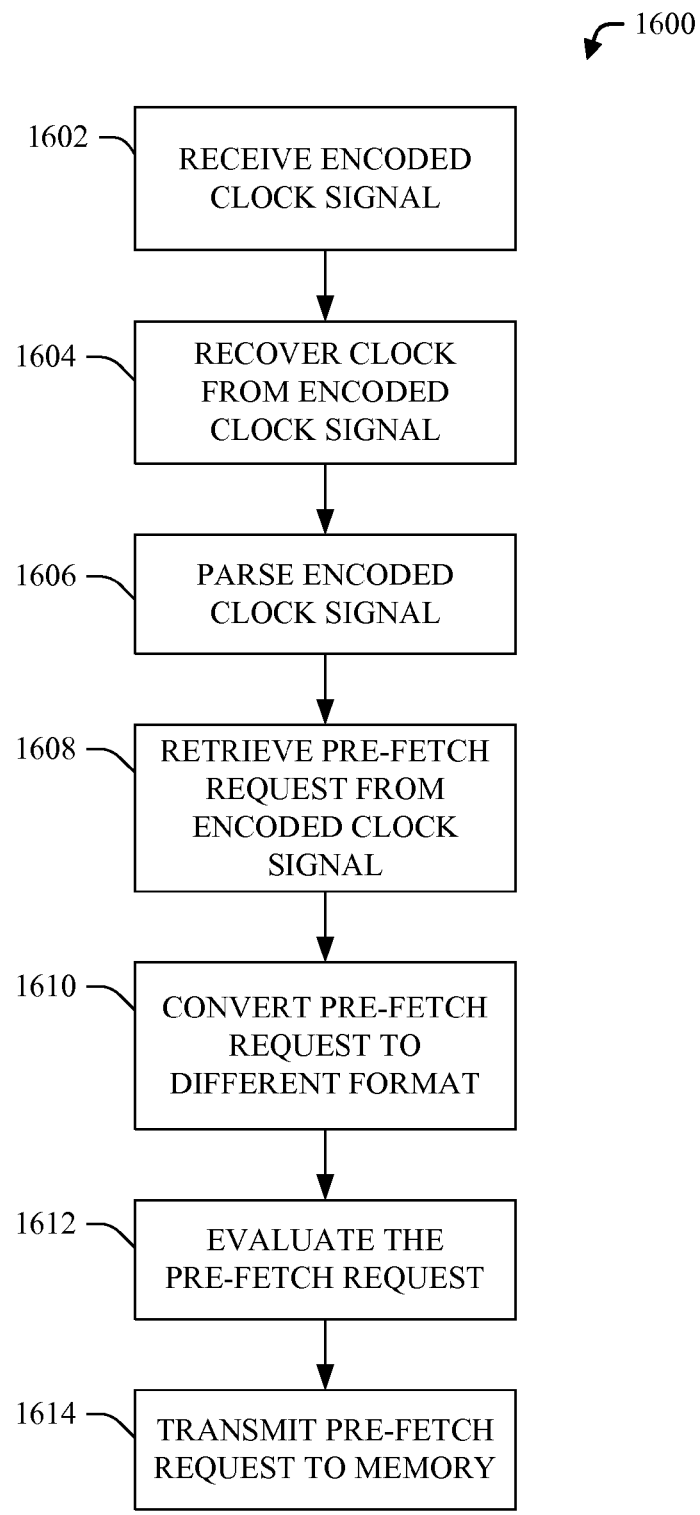
FIG. 16 depicts a methodology that can decode encoded clock signals to obtain pre-fetch requests and a clock signal to facilitate reading data associated with a memory in accordance with an aspect of the disclosed subject matter.

Referring to FIG. 16, depicted is a methodology 1600 that can facilitate decoding an encoded clock signal to retrieve a pre-fetch request and/or recover a clock signal to facilitate reading data from a memory in accordance with an aspect of the disclosed subject matter. At 1602, an encoded clock signal can be received. In one aspect, an encoded clock signal can be received by a propagation component (e.g., 108), where the encoded clock signal, as bit stream, can be fed into a register component (e.g., 302) to facilitate decoding the encoded clock signal. The propagation component can be associated with a memory component (e.g., 102) to which a pre-fetch request is directed in order to pre-fetch data from the memory component. In another aspect, the encoded clock signal can be a serial bitstream that can comprise a clock signal and a pre-fetch request. In one embodiment, the pre-fetch request can be an 8-bit read command that was converted into 10-bit based data packets, in accordance with 8b10b technology. The encoded clock signal can also include synchronization information (e.g., synchronization pattern) that can be associated with the clock signal.

At 1604, the clock signal can be recovered from the encoded clock signal. In one aspect, the propagation component can include a clock recovery component (e.g., 304) that can be associated with the register component and can recover the clock signal from the encoded clock signal.

At 1606, the encoded clock signal can be parsed to facilitate retrieving the pre-fetch request from the encoded clock signal. In one aspect, the propagation component can comprise a parser component (e.g., 306) that can parse the encoded clock signal fed into the register component and can evaluate the data in the signal to determine which data is associated with the pre-fetch request. At 1608, the pre-fetch request can be retrieved from the encoded clock signal. In one aspect, the parser component can parse the encoded clock signal and can retrieve the data comprising the pre-fetch request from the encoded clock signal. At 1610, the pre-fetch request can be converted to a different format. The pre-fetch request, as retrieved from the encoded clock signal, can be in a coded format (e.g., 8b10b format) that facilitates serial transmission of the pre-fetch request as part of the encoded clock signal. In one aspect, the parser component can convert the pre-fetch request from 10-bit based code into 8-bit based pieces of data that can be transmitted in parallel to the memory component 102 from the propagation component.

At 1612, the pre-fetch request can be evaluated. In one aspect, the propagation component can evaluate the pre-fetch request to determine whether the pre-fetch request is directed to a memory component associated with the propagation component. If the pre-fetch request is directed to a memory component associated with the propagation component, the propagation component can forward the pre-fetch request to the associated memory component. If the pre-fetch request is not directed to an associated memory component, the propagation component can disregard the pre-fetch request. It is to be appreciated, however, that the propagation component can propagate the encoded clock signal to another propagation component(s) associated therewith. For example, at the same time or substantially the same time as the propagation receives the encoded clock signal as an input, the propagation component can provide the encoded clock signal as an output to another propagation component, while also processing the encoded clock signal to recover the clock signal and retrieve the pre-fetch request from the encoded clock signal.

At 1614, the pre-fetch request can be transmitted. In one aspect, the propagation component can evaluate the pre-fetch request and determine that the pre-fetch request is directed to a memory component associated therewith. The propagation component can transmit the pre-fetch request to the memory component, where the memory component can service the pre-fetch request. At this point, methodology 1600 can end.

The subject innovation can facilitate improving read performance related to reading data from memory components associated with a network, such as an interconnect network component. The subject innovation can employ pre-fetch requests to pre-fetch data from memory components associated with the interconnect network component which can reduce latency associated with read operations, as the pre-fetch request can bypass components that can be contained in the interconnect network component and can be transmitted at a very high rate of speed as compared to a read command routed through the interconnect network component. Based in part on the pre-fetch request, the desired data can be retrieved from the memory component and routed through the interconnect network component to the desired destination.

In one aspect, utilizing pre-fetch requests can reduce and/or eliminate at least a portion of the latency associated with transmitting the read command to the memory component, as the read command can be discarded when the command converges with the read data in the interconnect network component, and the data can proceed to its destination; can reduce and/or eliminate the time associated with accessing the memory to read the data; and/or can reduce and/or eliminate at least a portion of the latency associated with transmitting the data through the interconnect network component, as the read data can already have traveled through part of its path to its destination when the read data and read command converge.

It should be appreciated that the methodologies disclosed herein and throughout this specification are capable of being stored on an article of manufacture to facilitate transporting and transferring such methodologies to computers. The term article of manufacture, as used herein, is intended to encompass a computer program accessible from any computer-readable device, carrier, or media.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 17:
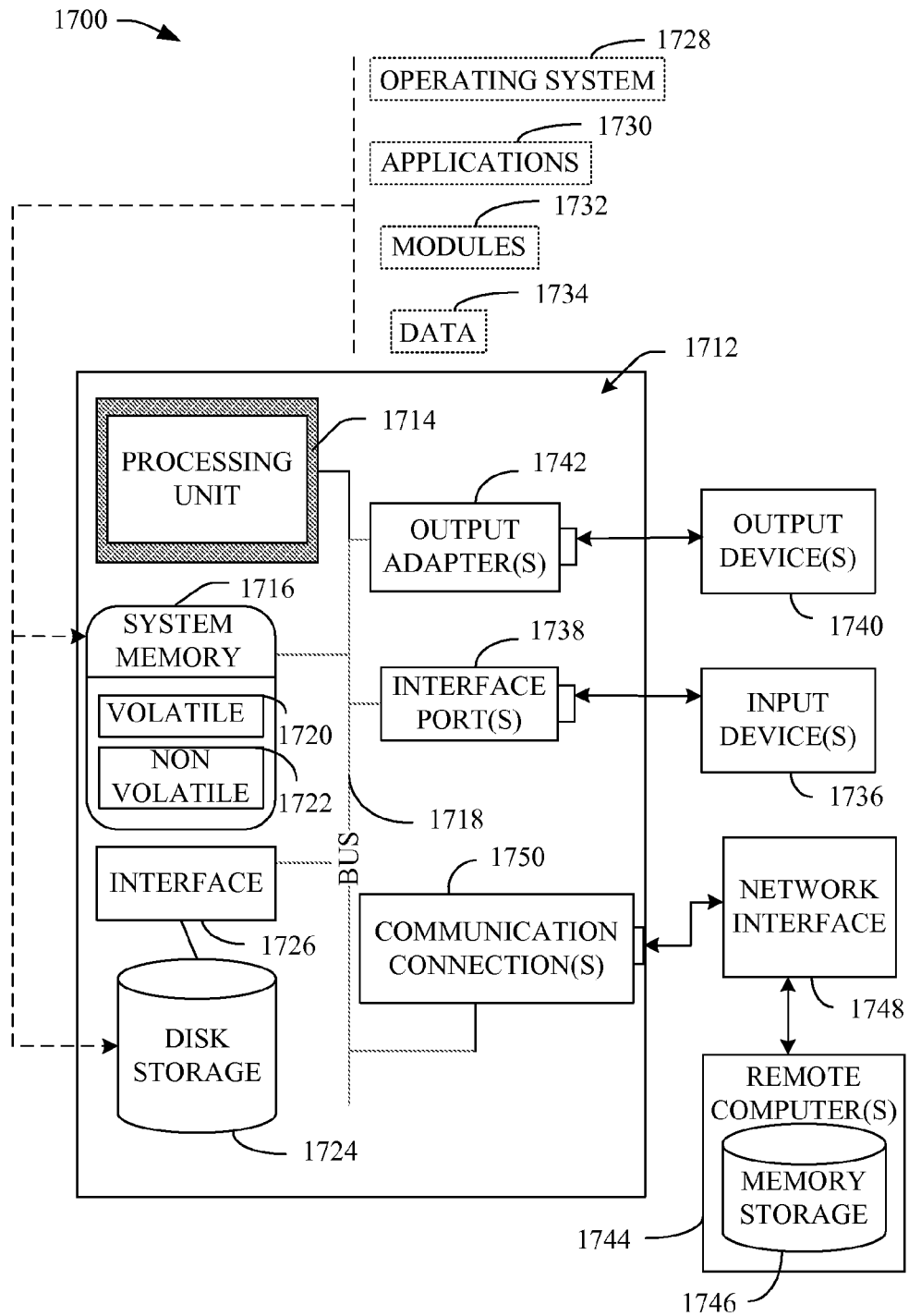
FIG. 17 is a schematic block diagram illustrating a suitable operating environment.
Figure 18:
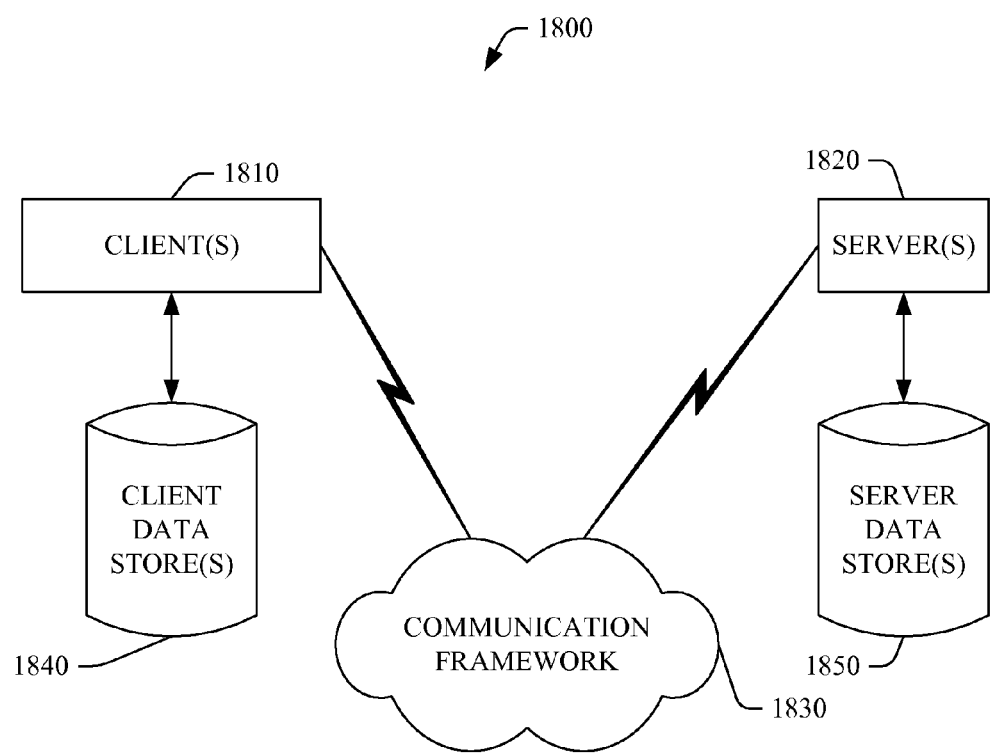
FIG. 18 is a schematic block diagram of a sample-computing environment.

In order to provide a context for the various aspects of the disclosed subject matter, FIGS. 17 and 18 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, handheld computing devices (e.g., personal digital assistant (PDA), phone), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 17, a suitable environment 1700 for implementing various aspects of the claimed subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable programmable ROM (EEPROM), or flash memory. Volatile memory 1720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1712 also includes removable/non-removable, volatile/non-volatile computer storage media. FIG. 17 illustrates, for example, a disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used, such as interface 1726.

It is to be appreciated that FIG. 17 describes software that acts as an intermediary between users and the basic computer resources described in the suitable operating environment 1700. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the claimed subject matter can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712, and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

FIG. 18 is a schematic block diagram of a sample-computing environment 1800 with which the subject innovation can interact. The system 1800 includes one or more client(s) 1810. The client(s) 1810 can be hardware and/or software (e.g., threads, processes, computing devices). The system 1800 also includes one or more server(s) 1820. Thus, system 1800 can correspond to a two-tier client server model or a multi-tier model (e.g., client, middle tier server, data server), amongst other models. The server(s) 1820 can also be hardware and/or software (e.g., threads, processes, computing devices). The servers 1820 can house threads to perform transformations by employing the subject innovation, for example. One possible communication between a client 1810 and a server 1820 may be in the form of a data packet transmitted between two or more computer processes.

The system 1800 includes a communication framework 1830 that can be employed to facilitate communications between the client(s) 1810 and the server(s) 1820. The client(s) 1810 are operatively connected to one or more client data store(s) 1840 that can be employed to store information local to the client(s) 1810. Similarly, the server(s) 1820 are operatively connected to one or more server data store(s) 1850 that can be employed to store information local to the servers 1820.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates access of data from at least one memory component, comprising:

the at least one memory component comprising a plurality of memory locations in which data is stored;

a pre-fetch generation component that generates at least one pre-fetch request based in part on a read command and directly transmits the at least one pre-fetch request to the at least one memory component to facilitate a read of data stored in the at least one memory component to facilitate a reduction in a latency associated with a service of a read command, the latency based in part on a route of the read command to the at least one memory component, the pre-fetch generation component encodes a subset of information associated with the read command and with a clock signal to form an encoded clock signal comprising the at least one pre-fetch request and transmits the encoded clock signal to the at least one memory component; and at least one propagation component that decodes the encoded clock signal to obtain the at least one pre-fetch request and transmits the at least one pre-fetch request to the at least one memory component, which reads data associated with the at least one pre-fetch request from a memory location associated with the at least one pre-fetch request.

2. The system of claim 1, further comprising an interconnect network component that facilitates transmission of information between the at least one memory component and at least one other component, the at least one pre-fetch request bypasses at least a portion of a data path associated with the interconnect network component to facilitate a reduction in the latency associated with the service of a read command.

3. The system of claim 2, the at least one memory component reads data associated with the at least one pre-fetch request and provides the data to the interconnect network component.

4. The system of claim 3, the read data converges with the read command in the interconnect network component and is compared with the read command to verify that the read data is associated with the read command.

5. The system of claim 2, the at least one memory component comprises a plurality of memory components associated with the interconnect network component, the pre-fetch generation component serially transmits the at least one pre-fetch request to the plurality of memory components.

6. The system of claim 1, further comprising at least one buffer component that is contained in the at least one memory component, the read data is stored in the at least one buffer component, and after the memory component receives the read command, the read data is compared with the read command to verify that the read data is associated with the read command.

7. The system of claim 1, the pre-fetch generation component encodes the at least one pre-fetch request based in part on an 8-bit, 10-bit format.

8. The system of claim 1, the at least one memory component comprising at least one of nonvolatile memory or volatile memory, or a combination thereof.

9. The system of claim 8, the nonvolatile memory comprising at least one of flash memory, mask-programmed read only memory, programmable read only memory, erasable programmable read only memory, Ultra Violet (UV)-erase erasable programmable read only memory, one-time programmable read only memory, electrically erasable programmable read only memory, or nonvolatile random access memory, or a combination thereof; and the volatile memory comprising at least one of random access memory, static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), or Rambus dynamic RAM (RDRAM), or a combination thereof.

10. An electronic device comprising at least a portion of the system of claim 1.

11. The electronic device of claim 10, the electronic device comprising one of a computer, a router, a media player and/or recorder, a television, a smart card, a phone, a cellular phone, a smart phone, an electronic organizer, a portable digital assistant (PDA), a portable email reader, a laptop computer, a digital camera, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation device, a secure memory device with computational capabilities, a device with a tamper-resistant chip, an embedded computer in a machine.

12. A method that facilitates reading data from at least one memory component, comprising:
receiving generated pre-fetch information based in part on a read command;
reading data based in part on the pre-fetch information;
encoding the pre-fetch information to incorporate the pre-fetch information with a clock signal;
forming an encoded clock signal comprising at least the encoded pre-fetch information;
transmitting the encoded clock signal; and
decoding the encoded clock signal to obtain the pre-fetch information.

13. The method of claim 12, further comprising:
generating the read command;
generating the pre-fetch information based in part on the read command;
transmitting the pre-fetch information;
receiving the pre-fetch information;
reading data based in part on the pre-fetch information; and
providing the read data.

14. The method of claim 12, further comprising:
storing the read data associated with the pre-fetch information;
receiving the read command;
comparing the read data with the read command;
at least one of:
providing the read data if the read data is associated with the read command, or
reading data associated with the read command if the read data is not associated with the read command and discarding the read data.

15. The method of claim 12, further comprising:
providing the read data; and
determining if the read data is associated with the read command, wherein such determination occurs at a convergence point where the read data and the read command converge.

16. The method of claim 15, further comprising:
discarding the read data if the read data is not associated with the read command;
transmitting the read command from the convergence point;
reading new data based in part on the read command; and
receiving the new read data.

17. The method of claim 15, further comprising:
discarding the read command; and
transmitting the read data from the convergence point; and
receiving the read data.

* * * * *